United States Patent
Bejerano et al.

(10) Patent No.: US 10,397,819 B2
(45) Date of Patent: Aug. 27, 2019

(54) DYNAMIC MONITORING AND MANAGEMENT IN WIRELESS SYSTEMS

(71) Applicants: Yigal Bejerano, Springfield, NJ (US); Chandrasekharan Raman, Somerset, NJ (US); Tomas S. Young, Parsippany, NJ (US); Chun Nam Yu, Jersey City, NJ (US); Hugo A. Infante, New Providence, NJ (US)

(72) Inventors: Yigal Bejerano, Springfield, NJ (US); Chandrasekharan Raman, Somerset, NJ (US); Tomas S. Young, Parsippany, NJ (US); Chun Nam Yu, Jersey City, NJ (US); Hugo A. Infante, New Providence, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 141 days.

(21) Appl. No.: 15/336,885

(22) Filed: Oct. 28, 2016

(65) Prior Publication Data
US 2017/0366993 A1    Dec. 21, 2017

Related U.S. Application Data

(60) Provisional application No. 62/352,774, filed on Jun. 21, 2016.

(51) Int. Cl.
*H04L 1/00* (2006.01)
*H04L 5/00* (2006.01)
(Continued)

(52) U.S. Cl.
CPC ............ *H04W 24/10* (2013.01); *H04L 1/0003* (2013.01); *H04L 1/003* (2013.01); *H04L 1/0021* (2013.01);
(Continued)

(58) Field of Classification Search
CPC ...... H04W 24/10; H04L 1/0003; H04L 5/006; H04L 12/189; H04L 43/16
See application file for complete search history.

(56) References Cited

U.S. PATENT DOCUMENTS 8,693,361 B2    4/2014   Bejerano et al.
9,007,978 B2    4/2015   Bejerano et al.
(Continued)

FOREIGN PATENT DOCUMENTS

| EP | 2 806 674 A1 | 11/2014 |
| WO | WO 2013/135874 A1 | 9/2013 |
| WO | WO 2015/116201 A1 | 8/2015 |

OTHER PUBLICATIONS

International Search Report and Written Opinion of corresponding PCT Application PCT/US2017/034932, dated Aug. 10, 2017, 17 pages.
(Continued)

*Primary Examiner* — Eric Myers
(74) *Attorney, Agent, or Firm* — Tong, Rea, Bentley & Kim, LLC

(57) ABSTRACT

The present disclosure generally discloses dynamic monitoring and management capabilities for use in wireless communication systems. The dynamic monitoring and management capabilities may be configured to support dynamic monitoring and management within various types of contexts and associated environments. The dynamic monitoring and management capabilities may include feedback collection capabilities, service quality evaluation capabilities, parameter tuning capabilities, or the like, as well as various combinations thereof.

20 Claims, 6 Drawing Sheets

(51) Int. Cl.
*H04L 12/18* (2006.01)
*H04L 12/26* (2006.01)
*H04W 24/10* (2009.01)

(52) U.S. Cl.
CPC .......... *H04L 1/0026* (2013.01); *H04L 1/0029* (2013.01); *H04L 5/006* (2013.01); *H04L 12/189* (2013.01); *H04L 43/16* (2013.01)

(56) References Cited

U.S. PATENT DOCUMENTS

| | | |
|---|---|---|
| 9,148,259 B2 | 9/2015 | Bejerano et al. |
| 2006/0256805 A1 | 11/2006 | Cho et al. |
| 2008/0045228 A1 | 2/2008 | Zhang et al. |
| 2008/0062948 A1 | 3/2008 | Ponnuswamy |
| 2008/0123544 A1 | 5/2008 | Tujkovic et al. |
| 2009/0316610 A1 | 12/2009 | Yellin et al. |
| 2010/0322102 A1 | 12/2010 | Zhou et al. |
| 2013/0198767 A1 | 8/2013 | Wang et al. |
| 2013/0223233 A1 | 8/2013 | Zhao et al. |
| 2014/0362687 A1 | 12/2014 | Bejerano et al. |
| 2015/0071190 A1 | 3/2015 | Lau et al. |
| 2016/0087769 A1 | 3/2016 | Wild |

OTHER PUBLICATIONS

3GPP, 3rd Generation Partnership Project, Technical Specification Group Radio Access Network; Universal Terrestrial Radio Access (UTRA) and Evolved Universal Terrestrial Radio Access (E-UTRA); Radio measurement collection for Minimization of Drive Tests (MDTS); Overall Description; Stage 2, Release 11, 3GPP TS 37.320, V11.4.0, Sep. 20, 2014, pp. 1-23.
3GPP, "3GPP TS 23.246 V13.1.0, 3rd Generation Partnership Project; Technical Specification Group Services and System Aspects; Multimedia Broadcast/Multicast Service (MBMS); Architecture and functional description," (Release 13), Jun. 2015, pp. 1-68.
3GPP, "3GPP TS 26.346 V13.1.0, 3rd Generation Partnership Project; Technical Specification Group Services and System Aspects; Multimedia Broadcast/Multicast Service (MBMS); Protocols and codes," (Release 13), Jun. 2015, pp. 1-209.
3GPP, "3GPP TS 32.422 V13.0.0, 3rd Generation Partnership Project; Technical Specification Group Services and System Aspects; Telecommunication management; Subscriber and equipment trace; Trace control and configuration management," (Release 13), Jun. 2015, pp. 1-30.
Gemalto,"Building trust in mobile apps," www.gemalto.com, printed on Jan. 24, 2017, 2 pages.
WITBE, "WITBE Workbench Suite," www.witbe.com, printed on Jan. 24, 2017, 2 pages.
Spirent, "Connecting a smarter future," www.spirent.com, printed on Jan. 24, 2017, 5 pages.
Rohde & Schwarz, "Mobile Network Testing," www.mobile-network-testing.com, printed on Jan. 24, 2017, 10 pages.
Avsystem, "Device Management," www.avsystem.com, printed Jan. 24, 2017, 3 pages.
IXIA, "IXIA Solutions Overview," www.ixiacom.com, printed on Jan. 24, 2017, 6 pages.
VIAVI Solutions Inc., "Introducing CERTiFi form Enterprise Test & Certification," www.viavisolutions.com/en-us, printed on Jan. 24, 2017, 6 pages.
ASCOM, "ASCOM Myco," www.ascom.com, printed on Jan. 24, 2017, 4 pages.
NOBEL Biocare, "NOBEL Biocare," www.nobelbiocare.com/international/en/home.html, printed on Jan. 24, 2017, 4 pages.
Netscout, "Application and Network Performance Management," www.netscout.com, printed on Jan. 24, 2017, 12 pages.
CNN Money, "What a world with 5G will look like," 2020 Visionaries, Feb. 9, 2016, http://money.cnn.com/2016/02/09/technology/5g/index.html, printed on Jan. 24, 2017, 4 pages.
Ericsson, "Ericsson leads global discussion on LTE Broadcast at Mobile World Congress 2016," Feb. 23, 2016, http://www.ericsson.com/news/1988292, printed on Jan. 24, 2017, 3 pages.
Cisco, "Cisco connected Stadium Wi-Fi Services," 2011, \http://www.cisco.com/web/strategy/docs/sports/c78-675064_svcs.pdf, printed on Jan. 24, 2017, 5 pages.
YINZCAM, "YINZCAM," www.yinzcam.com, printed on Jan. 24, 2017, 8 pags.
Bejerano, et al., "Scalable WiFi Multicast Services for Very Large Groups," IEEE International Conference on Network Protocols 2013 (IEEE ICNP'13, 2013), Oct. 7-10, 2013, 12 pages.
Bejerano, et al., "Experimental evaluation of a scalable WiFi multicast scheme in the ORBIT testbed," in Proceedings of 2014 Third GENI Research and Educational Experiment Workshop (GREE14), Mar. 19-20, 2014, pp. 36-42.
Choi, et al., "Leader-based multicast service in IEEE 802.11v networks," in Proc. IEEE Consumer Communications and Networking Conference (CCNC'10), Jan. 9-12, 2010, 5 pages.
Kuri, et al., "Reliable multicast in multi-access wireless LANs," ACM Journal of Wireless Networks, vol. 7, Aug. 1, 2001, pp. 359-369.
Sun, et al., "Reliable MAC layer multicast in IEEE 802.11 wireless networks," in IEEE Proceedings of the International Conference on Parallel Processing 2002 ( ICPP'02), Aug. 21, 2002, 10 pages.
Silberschatz, et al., "Database System Concepts," Sixth Edition, McGraw-Hill, Jan. 28, 2010, 1,376 pages.
Qualcomm, "QXDM Professional—Quikstart," https://www.qualcomm.com/media/documents/files/qxdm-professional-qualcomm-extensiblediagnostic-monitor.pdf, printed on Feb. 10, 2017, 2 pages.
Android Developers, "Logcat Command-line Tool," http://developer.android.com/tools/help/logcat.html, printed Feb. 9, 2017, 13 pages.
Sutton et al., "Reinforcement learning: An introduction," MIT Press, Cambridge, Feb. 1998, 334 pages.
Wu et al., "IPTV Multicast over Wireless LAN Using Merged Hybrid ARQ with Staggered Adaptive FEC," IEEE Transactions on Broadcasting, vol. 55, No. 2, Apr. 21, 2009, pp. 363-374.
Papagiannaki et al., "Experimental Characterization of Home Wireless Networks and Design Implications," in Proc. IEEE INFOCOM 2006, 25th IEEE International Conference on Computer Communications, Apr. 23-29, 2006, 13 pages.
Afolabi et al., "Multicast Scheduling and Resource Allocation Algorithms for OFDMA-Based Systems: A Survey," IEEE Communications Surveys & Tutorials, vol. 15, No. 1, Feb. 7, 2012, pp. 240-254.
Alay et al., "Dynamic Rate and FEC Adaptation for Video Multicast in Multi-rate Wireless Networks," ACM/Springer Mobile Networks and Applications (MONET), Special Issue on Advances in Wireless Testbeds and Research Infrastructures., vol. 15, No. 3, Feb. 2010, pp. 425-434.
Park et al., "Multi-room IPTV Delivery Through Pseudo-broadcast over IEEE 802.11 links," in Proc. IEEE Vehicular Technology Conference 2010 (VTC'10), May 16-19, 2010, 5 pages.
Li, et al., "HLBP: A Hybrid Leader Based Protocol for MAC Layer Multicast Error Control in Wireless LANs," in Proc. IEEE Global Telecommunications conference 2008 (GLOBECOM'08), Nov. 30-Dec. 4, 2008, 6 pages.
Seok, et al., "Efficient Multicast Supporting in Multi-rate Wireless Local Area Networks," in Proc. IEEE International Conference on Information Networking 2003 (ICOIN'03), Feb. 12-14, 2003, 11 pages.
Urie, et al., "Evolved Multimedia Broadcast Multicast Service in LTE: An Assessment of System Performance Under Realistic Radio Network Engineering Conditions," Bell Labs Technical Journal, vol. 18, No. 2, Sep. 2013, pp. 57-76.
Basalamah, et al., "Rate adaptive reliable multicast MAC protocol for WLANs," in Proc. IEEE Vehicular Technology Conference 2006 (VTC'06), May 7-10, 2006, 5 pages.
Wang, et al., "Supporting MAC layer multicast in IEEE 802.11n: Issues and Solutions," in Proc. IEEE Wireless Communications and Networking Conference 2009 (WCNC'09), Apr. 5-8, 2009, 6 pages.

(56) References Cited

OTHER PUBLICATIONS

Tanigawa, et al., "Transparent unicast translation to improve quality of multicast over wireless LAN," in Proc. IEEE Consumer Communications and Networking Conference (CCNC'10), Jan. 9-12, 2010, 5 pages.

Lim, et al., "Design of Efficient Multicast Protocol for IEEE 802.11n WLANs and Cross-layer Optimization for Scalable Video Streaming," IEEE Transactions on Mobile Computing, vol. 11, No. 5, May 12, 2012, pp. 780-792.

Chiao, et al., "WiFi Multicast Streaming Using AL-FEC Inside the Trains of High-speed Rails," in Proc. IEEE International Symposium on Broadband Multimedia Systems and Broadcasting 2012 (BMSB'12), Jun. 27-29, 2012, 6 pages.

Bejerano, et al., "DyMo: Dynamic Monitoring of Large Scale LTE-Multicast Systems," 9 pages, https://arxiv.org/abs/1701.02809, Jan. 10, 2017.

TCPDUMP, "User Commands," http://www.tcpdump.org/tcpdum_man.html, updated Jul. 11, 2014, 18 pages.

3GPP, "3GPP TS 22.468, V13.0.0, "Technical Specification Group Services and System Aspects: Group Communication System Enablers for LTE (GCSE_LTE) Release 13, Dec. 2014, 22 pages.

IEEE, "IEEE P802.11aa, Draft Standard for Information Technology, Telecommunications and information exchange between systems, Local and metropolitan area networks, Specific requirements, Part 11: Wireless LAN medium access control (MAC) and physical layer (PHY) specifications, Amendment 2: MAC Enhancements for Robust Audio Video Streaming," Dec. 2011, 147 pages.

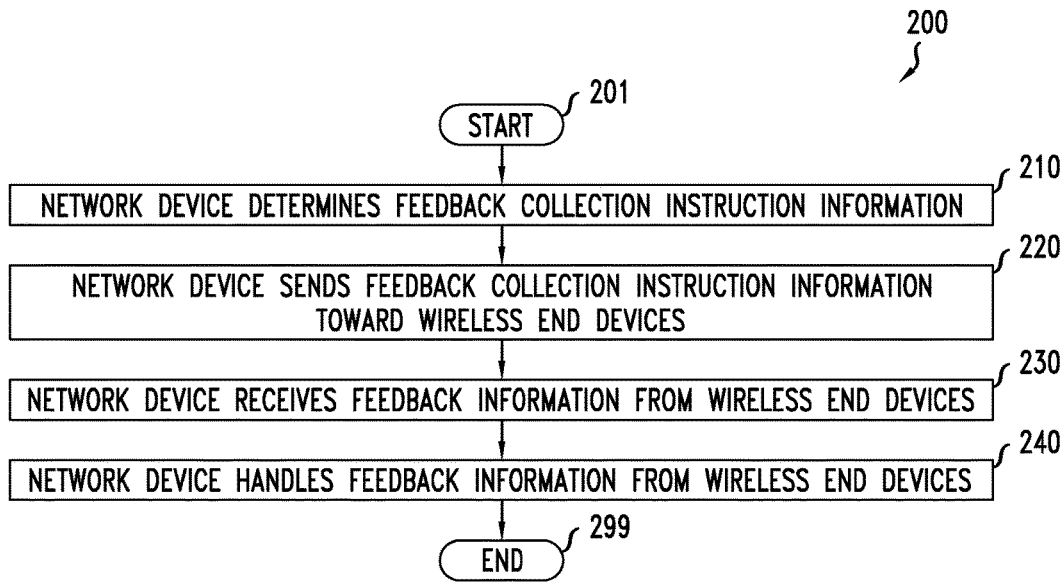
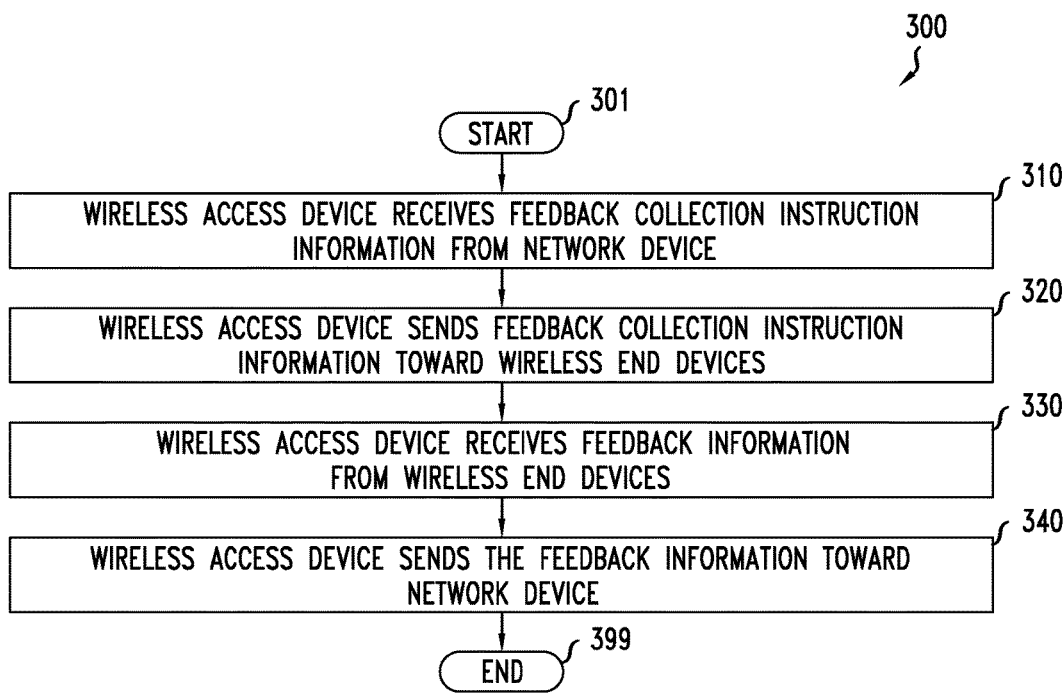

DYNAMIC MONITORING AND MANAGEMENT IN WIRELESS SYSTEMS

CROSS-REFERENCE TO RELATED APPLICATIONS

This application claims the benefit of U.S. Provisional Patent Application Ser. No. 62/352,774, filed Jun. 21, 2016, which is hereby incorporated herein by reference.

TECHNICAL FIELD

The present disclosure relates generally to communication networks and, more particularly but not exclusively, monitoring and tuning in wireless communication networks.

BACKGROUND

Long Term Evolution (LTE) evolved Multimedia Broadcast/Multicast Service (eMBMS) service has gained attention as an attractive solution for video delivery to large groups of User Equipments (UEs) in crowded areas. The deployment of the eMBMS system, however, is challenging due to the lack of real-time feedback from the UEs. As a result, the eMBMS service is provided without quality of service (QoS) guarantees and with limited resource utilization, due to the usage of conservative modulation and coding scheme (MCS) parameters. Additionally, other broadcast and multicast services that may be provided in other types of wireless networks also may suffer from similar problems.

SUMMARY

The present disclosure generally discloses dynamic monitoring and management capabilities for use in wireless systems.

In at least some embodiments, an apparatus is provided. The apparatus includes a processor and a memory communicatively connected to the processor. The processor is configured to receive, at a wireless end device, feedback collection instruction information including an indication of a quality threshold and an indication of a feedback probability that the wireless end device is to provide feedback information to a network device. The processor is configured to determine whether a measured quality level of the wireless end device satisfies the quality threshold. The processor is configured to determine, based on a determination that the measured quality level of the wireless end device does not satisfy the quality threshold and based on the feedback probability, whether the wireless end device is to provide feedback information to the network device. The processor is configured to send feedback information from the wireless end device toward the network device based on a determination that the wireless end device is to provide feedback information to the network device. In at least some embodiments, a non-transitory computer-readable storage medium stores instructions which, when executed by a computer, cause the computer to perform a corresponding method. In at least some embodiments, a corresponding method is provided.

In at least some embodiments, an apparatus is provided. The apparatus includes a processor and a memory communicatively connected to the processor. The processor is configured to receive, at a wireless access device, feedback collection instruction information including an indication of a quality threshold and an indication of a feedback probability that the wireless end device is to provide feedback information to a network device. The processor is configured to send the feedback collection instruction information from the wireless access device toward a set of wireless end devices. In at least some embodiments, a non-transitory computer-readable storage medium stores instructions which, when executed by a computer, cause the computer to perform a corresponding method. In at least some embodiments, a corresponding method is provided.

In at least some embodiments, an apparatus is provided. The apparatus includes a processor and a memory communicatively connected to the processor. The processor is configured to determine a quality threshold and a probability that a given wireless end device is to provide feedback information to a network device based on a determination that a measured quality level of the given wireless end device does not satisfy the quality threshold. The processor is configured to send, toward a set of wireless end devices, feedback collection instruction information comprising an indication of the quality threshold and an indication of the probability that the given wireless end device is to provide feedback information to the network device. In at least some embodiments, a non-transitory computer-readable storage medium stores instructions which, when executed by a computer, cause the computer to perform a corresponding method. In at least some embodiments, a corresponding method is provided.

Various embodiments may be provided within the context of, or relate to, a Dynamic Monitoring system (referred to herein as DyMo).

BRIEF DESCRIPTION OF THE DRAWINGS

The teachings herein can be readily understood by considering the following detailed description in conjunction with the accompanying drawings, in which:

FIG. 2 depicts an embodiment of a method for use by a network device in controlling collection of feedback information from wireless end devices;

FIG. 3 depicts an embodiment of a method for use by a wireless access device in supporting collection of feedback information from wireless end devices;

To facilitate understanding, identical reference numerals have been used, where possible, to designate identical elements that are common to the figures.

DETAILED DESCRIPTION

The present disclosure generally discloses dynamic monitoring and management capabilities for use in wireless communication systems. The dynamic monitoring and management capabilities for use in wireless communication systems may be configured to support dynamic monitoring and management within various types of contexts and associated environments, such as within the context of broadcast and multicast services provided in wireless networks (e.g., the evolved Multimedia Broadcast Multicast Service (eM-BMS) service in Long Term Evolution (LTE) wireless networks or other types of broadcast and multicast services in other types of wireless networks) for delivery of content (e.g., video content, multimedia content, or the like), within the context of user experience control, within the context of machine-type-communication (MTC) or Internet-of-Things (IoT) environments, or the like, as well as various combinations thereof. The dynamic monitoring and management capabilities may include feedback collection capabilities, service quality evaluation capabilities, parameter tuning capabilities, or the like, as well as various combinations thereof. The dynamic monitoring and management capabilities may be implemented as a Dynamic Monitoring (DyMo) system, embodiments of which are discussed further below. These and various other embodiments and potential advantages of the dynamic monitoring and management capabilities may be further understood by way of reference to the exemplary wireless communication system of FIG. 1.

Figure 1:
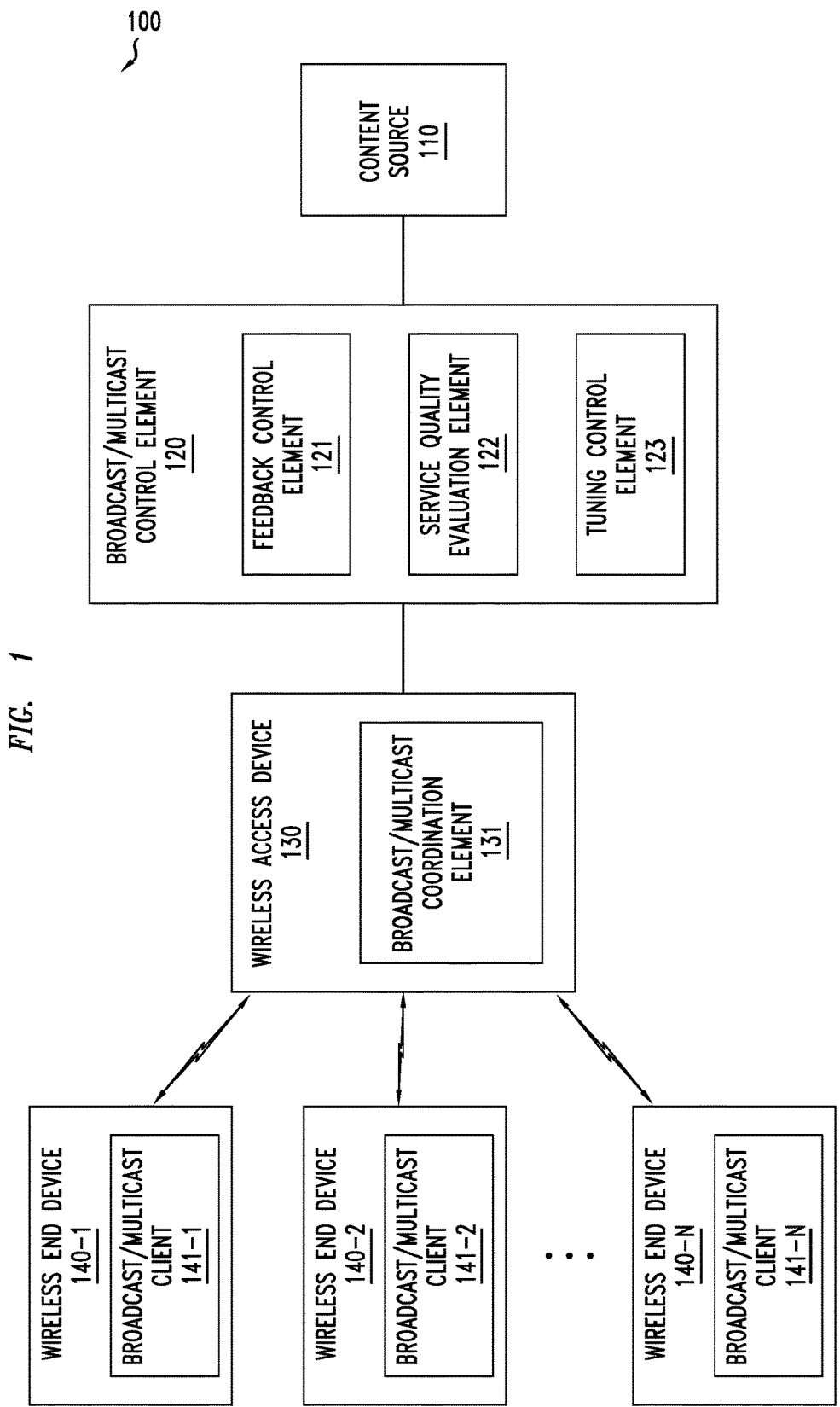
FIG. 1 depicts an exemplary wireless communication system that is configured to support dynamic monitoring and management capabilities within the context of use of broadcast/multicast services of the wireless communication system for content delivery.

FIG. 1 depicts an exemplary wireless communication system that is configured to support dynamic monitoring and management capabilities within the context of use of broadcast/multicast services of the wireless communication system for content delivery.

The wireless communication system 100 is configured to support delivery of content (e.g., video content, multimedia content, or the like) to wireless end devices (e.g., wireless user devices, IoT devices or the like). Multimedia content delivery, such as video clips, is an essential service for wireless networks. However, certain measurement studies have shown that video streaming over certain wireless networks (e.g., LTE networks) may not satisfy the demand in crowded areas. The inability to address the growing demand has led to several solutions that are based on dense deployment of access points (APs) or base stations (BSs) that provide dedicated delivery to wireless end devices; however, such solutions require high capital and operational expenditure and may suffer from extensive interference between adjacent devices. Wireless multicast offers another approach for delivering multimedia content to large groups, where the users share common interests. This is the case in sports arenas, entertainment centers, lecture halls, and transportation hubs, where users are interested in venue specific content. However, in cellular networks (e.g., LTE) as well as IEEE 802.11 (WiFi) networks, multicast services are provided without quality of service (QoS) guarantees due to the lack of feedback from the wireless end devices. Consequently, typically only limited multicast services are provide at relatively low bit rates (e.g., at 6 Mbps for 802.11a/g).

The wireless communication system 100, as discussed further below, may be configured to overcome such problems or potential problems associated with delivery of content to groups of wireless end devices by supporting dynamic monitoring and management capabilities within the context of use of broadcast/multicast services of the wireless communication system for content delivery to wireless end devices. The dynamic monitoring and management capabilities may include feedback collection capabilities, which may include controlling collection of feedback from wireless end devices in a probabilistic manner. The dynamic monitoring and management capabilities may include feedback collection capabilities, which may include evaluation of the service quality based on evaluation of feedback information collected from the wireless end devices. The dynamic monitoring and management capabilities may include parameter tuning capabilities, which may include dynamically adapting video control, dynamically adapting transmission parameters (e.g., Modulation and Coding Scheme (MCS), forward error correction (FEC), or the like), or the like, as well as various combinations thereof.

The wireless communication system 100 includes a content source (CS) 110, a broadcast/multicast control element (BMCE) 120, a wireless access device (WAD) 130, and a set of wireless end devices (WEDs) 140-1-140-N (collectively, WEDs 140).

The CS 110 is configured to provide content 111 that will be delivered to WEDs 140 via BMCE 120 and WAD 130. The content 111 may include video content, multimedia content, or the like. The content 111 may be stored by CS 110 or obtained by CS 110 from one or more other content sources. The CS 110 may support various video processing capabilities (e.g., video coding capabilities or the like). The CS 110 provides content 111 to the BMCE 120 for delivery to WEDs 140 using broadcast/multicast services. The CS 110 may be configured to dynamically control delivery of content 111 to the BMCE 120, for delivery to WEDs 140 using broadcast/multicast services, based on content control information received from the BMCE 120 (e.g., which may be determined by the BMCE 120 based on various capabilities supported by the BMCE 120, such as feedback collection capabilities, service evaluation capabilities, or the like). The CS 110 may be configured to support various other capabilities.

The BMCE 120 is configured to support delivery of content 111 of the CD 110 to WEDs 140 via the WAD 130 using broadcast/multicast services. The BMCE 120 includes a feedback control element (FCE) 121 that is configured to control collection of feedback information from WEDs 140, a service evaluation element (SEE) 122 that is configured to evaluate the service provided to WEDs 140 in delivering the content 111 of the CD 110 to WEDs 140 via the WAD 130, and a tuning control element (TCE) 123 that is configured to provide dynamic parameter tuning for dynamically controlling (and improving or even optimizing) the delivery of the content 111 of the CD 110 to WEDs 140 via the WAD 130. The BMCE 120 may be configured to support various other capabilities.

The WAD 130 is a wireless access device configured to operate as a point of wireless access for the WAD 130. The WAD 130 supports an air interface for WEDs 140 and is communicatively connected to BMCE 120. The WAD 130 is configured to support delivery of the content 111 of the CD 110 to WEDs 140 based on the broadcast/multicast service supported by BMCE 120. The WAD 130 also may be configured to support delivery of other types of content (e.g., unicast content) to WEDs 140, propagation of information sourced by the WEDs 140, exchange of control information with WEDs 140, and so forth. The WAD 130 includes a broadcast/multicast coordination element (BMCE) 131. The BMCE 131 is configured to support collection of feedback information from WEDs 140 under the control of FCE 121 of BMCE 120 (e.g., propagating feedback collection instructions from BMCE 130 to WEDs 140, propagating feedback information received from WEDs 140 upstream toward BMCE 120 for processing by SEE 122 of BMCE 120, or the like). The WAD 130 may be configured to support various other capabilities.

The WEDs 140 include wireless end devices configured for wireless communication via wireless access devices (illustratively, WAD 130). The WEDs 140 are configured to receive the content 111 of the CD 110 based on the broadcast/multicast service supported by BMCE 120. The WEDs 140 may be configured to handle the received content 111 of the CD 110 in various different ways (e.g., storing the received content 111, processing the received content 111, presenting the received content 111 via one or more presentation interfaces, or the like, as well as various combinations thereof). The WEDs 140 may be configured to receive and send other types of content (e.g., unicast content) via the WAD 130, support exchange of control information via the WAD 130, and so forth. The WEDs 140-1-140-N include broadcast/multicast client elements (BMCEs) 141-1-141-N (collectively, BMCEs 141), respectively. The BMCEs 141 are configured to collect feedback information under the control of FCE 121 of BMCE 120 and to send the collected feedback information for delivery to BMCE 120 for processing by SEE 122 of BMCE 120. The WEDs 140 may include wireless end devices (e.g., smartphones, tablets, laptops, or the like), IoT devices or other types of machine-type-communication (MTC) devices (e.g., machines, sensors, appliances, or the like), or the like, as well as various combinations thereof. The WEDs 140 each may be configured to support various other capabilities.

The wireless communication system 100, as indicated above, is configured to support dynamic collection of feedback information from WEDs 140.

The wireless communication system 100 is configured to support determination and propagation of feedback collection instruction information for dynamic collection of feedback information from WEDs 140. The BMCE 120 is configured to determine feedback collection instruction information and to send the feedback collection instruction information toward the WAD 130 for delivery to WEDs 140. The WAD 130 is configured to receive the feedback collection instruction information from BMCE 120 and to send the feedback collection instruction information toward WEDs 140. The WEDs 140 are configured to receive the feedback collection instruction information from WAD 130. The feedback collection instruction information may be propagated from the BMCE 120 to WEDs 140 using a broadcast capability, a multicast capability, or the like. The feedback collection instruction information may be determined based on previously received feedback information received from WEDs 140. The feedback collection instruction information may include a set of one or more quality thresholds and an associated set of one or more feedback collection probabilities, respectively. The feedback collection probability associated with a corresponding quality threshold is a probability that a WED 140 is to provide feedback information to BMCE 120 based on a determination that a measured quality level of the WED 140 does not satisfy the quality threshold. The quality thresholds and the associated feedback collection probabilities may be arranged such that WEDs 140 having lower quality (e.g., in terms of SNR or other types of quality measures) having a higher probability of reporting feedback information. The feedback collection instruction information may include, for one or more quality thresholds, one or more additional conditions that must be met by a WED 140 before the WED 140 applies the associated feedback collection probability for determining whether to provide feedback information to BMCE 120. The one or more additional conditions may include a location condition (e.g., a WED 140 must be located within a certain cell, within a certain geographic area, or the like), a time condition (e.g., the current time is during a reporting interval, a time period during which an event is taking place, or the like), a device status condition (e.g., a WED 140 must have a particular device status), or the like, as well as various combinations thereof. The feedback collection instruction information may include, for one or more quality thresholds, an indication of the feedback information to be collected. The feedback information to be collected may include WED identification information, WED location information, quality-of-service information (e.g., radio frequency (RF) signal measurement information, information indicative of packets received and lost, or the like), or the like, as well as various combinations thereof. The feedback collection instruction information may include, for one or more quality thresholds, an indication of a feedback rate at which feedback information is to be reported (e.g., one feedback message per reporting interval, three feedback messages per reporting interval, or the like). The feedback collection instruction information may include various other types of information configured for use in controlling dynamic collection of feedback information from WEDs 140.

The wireless communication system 100 is configured to support collection and propagation of feedback information collected from WEDs 140 for delivery to BMCE 120. The WEDs 140 are configured to collect feedback information based on feedback collection instruction information received from BMCE 120 via the WAD 130. The WEDs 140 are configured to send the feedback information toward WAD 130 for delivery to BMCE 120. The WAD 130 is configured to receive the feedback information from WEDs 140 and to send the feedback information to BMCE 120. The BMCE 120 is configured to receive the feedback information from the WAD 130. The feedback information of WEDs 140 may be communicated from the WEDs 140 to the BMCE 120 using unicast communications. The BMCE 120 is configured to process the feedback information. The BMCE 120 may process the feedback information for various purposes (e.g., to perform service quality evaluation processing for evaluating the quality-of-service being provided to WEDs 140 during delivery of broadcast/multicast services to WEDs 140, to dynamically tune parameters associated with delivery of broadcast/multicast services to WEDs 140, to modify feedback collection instruction information to be provided to the WEDs 140 for future collection of feedback information, or the like, as well as various combinations thereof. The feedback information may include WED identification information, WED location information, quality-of-service information (e.g., RF signal measurement information, information indicative of packets received and lost, or the like), or the like, as well as various combinations thereof. The feedback information may include various other types of information configured for use by the BMCE 120 in providing various control functions.

The wireless communication system 100, as indicated above, is configured to support service quality evaluation for evaluating the quality of service provided to WEDs 140. The service quality evaluation may be performed by BMCE 120 based on feedback information received by BMCE 120 from the WEDs 140.

The wireless communication system 100, as indicated above, is configured to support dynamic parameter tuning for controlling the quality of service provided to WEDs 140. The dynamic parameters tuning may be controlled by BMCE 120 based on the service quality evaluation performed by BMCE 120 for evaluating the quality of service provided to WEDs 140.

The wireless communication system 100, as indicated above, may be implemented based on various types of wireless technologies (e.g., Second Generation (2G) cellular technologies, Third Generation (3G) cellular technologies, Fourth Generation (4G) cellular technologies such as LTE or LTE-Advanced), Fifth Generation (5G) cellular technologies, or the like). It will be appreciated that, depending on the type of wireless technology that is used, the various elements of the wireless communication system 100 may be implemented as, or as part of, elements of the wireless technology that is used. For example, within the content of an LTE system using eMBMS services, the BMCE 120 may be referred to as a Broadcast Multicast Service Center (BMSC), WAD 130 may be referred to as an evolved NodeB (eNodeB), and WEDs 140 may be referred to as User Equipments (UEs).

FIG. 2 depicts an embodiment of a method for use by a network device in controlling collection of feedback information from wireless end devices. It is noted that, although presented herein as being performed serially, at least a portion of the functions of method 200 may be performed contemporaneously or in a different order than as presented. It also will be appreciated that various portions of the functions of method 200 may be split into separate processes or organized or implemented in other ways. At block 201, method 200 begins. At block 210, the network device determines feedback collection instruction information. At block 220, the network device sends the feedback collection instruction information toward wireless end devices (e.g., toward a wireless access device serving the wireless end devices). At block 230, the network device receives feedback information from wireless end devices. At block 240, the network device handles the feedback information from wireless end devices (e.g., stores the feedback information, processes the feedback information, further propagates the feedback information, or the like). At block 299, method 200 ends.

FIG. 3 depicts an embodiment of a method for use by a wireless access device in supporting collection of feedback information from wireless end devices. It is noted that, although presented herein as being performed serially, at least a portion of the functions of method 300 may be performed contemporaneously or in a different order than as presented. It also will be appreciated that various portions of the functions of method 300 may be split into separate processes or organized or implemented in other ways. At block 301, method 300 begins. At block 310, the wireless access device receives feedback collection instruction information from a network device. At block 320, the wireless access device sends the feedback collection instruction information toward wireless end devices. At block 330, the wireless access device receives feedback information from wireless end devices. At block 340, the wireless access device sends the feedback information toward the network device. At block 399, method 300 ends.

Figure 4:
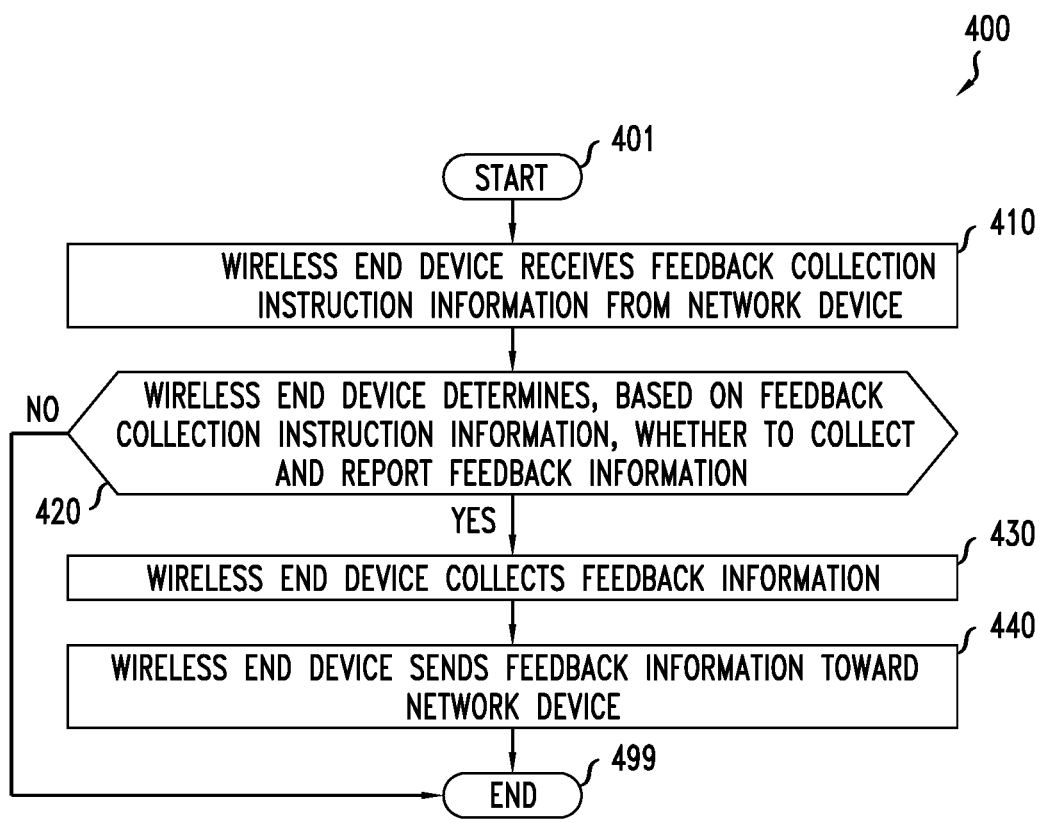
FIG. 4 depicts an embodiment of a method for use by a wireless end device collecting feedback information under the control of a network device and reporting the feedback information to the network device.

FIG. 4 depicts an embodiment of a method for use by a wireless end device collecting feedback information under the control of a network device and reporting the feedback information to the network device. It is noted that, although presented herein as being performed serially, at least a portion of the functions of method 400 may be performed contemporaneously or in a different order than as presented. It also will be appreciated that various portions of the functions of method 400 may be split into separate processes or organized or implemented in other ways.

At block 401, method 400 begins.

At block 410, the wireless end device receives feedback collection instruction information from a network device. The feedback collection instruction information may include one or more conditions and a feedback probability. The one or more conditions may include a service quality condition (e.g., service quality of the wireless end device satisfying a service quality threshold specified in the feedback collection instruction information) and, optionally, one or more additional conditions (e.g., a location condition, a time condition, or the like, as well as various combinations thereof). The feedback probability is a probability that the wireless end device is to collect and report feedback information based on a determination that the one or more conditions are satisfied. The feedback collection instruction information also may include an indication of the feedback information to be collected (e.g., wireless end device identification information, wireless end device location information, quality-of-service information, or the like, as well as various combinations thereof), an indication of a feedback rate at which feedback information is to be reported, or the like, as well as various combinations thereof.

At block 420, the wireless end device determines, based on the feedback collection instruction information, whether to collect and report feedback information. The determination as to whether to collect and report feedback information may be based on one or more conditions specified in feedback collection instruction information. The one or more conditions include a service quality condition (e.g., service quality of the wireless end device satisfying a service quality threshold specified in the feedback collection instruction information) and, optionally, one or more additional conditions (e.g., a location condition, a time condition, or the like, as well as various combinations thereof). If any of the required conditions for feedback collection and reporting are not satisfied, a determination is made that feedback is not to be collected or reported by the wireless end device and, thus, method 400 proceeds to block 499, where method 400 ends. If the required conditions for feedback collection and reporting are satisfied, then the determination as to whether to collect and report feedback information may be further based on a feedback probability specified in the feedback collection instruction information. If a determination is made, based on the feedback probability, that feedback is not to be collected or reported by the wireless end device, then method 400 proceeds to block 499, where method 400 ends. If a determination is made, based on the feedback probability, that feedback is to be collected and reported by the wireless end device, then method 400 proceeds to block 430.

At block 430, the wireless end device collects feedback information. The wireless end device may collect the feedback information based on the feedback collection instruction information. The feedback information may include wireless end device identification information, wireless end device location information, quality-of-service information (e.g., RF signal measurement information, information indicative of packets received and lost, or the like), or the like, as well as various combinations thereof.

At block 440, the wireless end device sends the feedback information toward the network device.

At block 499, method 400 ends.

Various embodiments of the dynamic monitoring and management capabilities presented above may be implemented in various ways. In at least some embodiments, for example, various dynamic monitoring and management capabilities presented above may be implemented based on a Dynamic Monitoring ($D_yMo$) system which is depicted and described further herein with respect to FIGS. 5-6.

In at least some embodiments, monitoring and control over large systems may be provided using embodiments of a Dynamic Monitoring (DyMo) capability. Due to the proliferation of numerous cellular and Internet of Things (IoT) nodes, monitoring and configuration of large groups of nodes has gained importance. In at least some embodiments, DyMo may be configured to leverage wireless multicast capabilities (e.g., LTE eMBMS) for distributing instructions and queries to relevant nodes. In at least some embodiments, DyMo may be configured to collect and analyze responses from device subsets, thereby significantly reducing feedback communication overhead. In at least some embodiments, DyMo may be configured to accurately LTE-eMBMS video distribution in crowded venues, such as sports arenas. In such venues, quality monitoring typically is very challenging, due to the lack of real-time feedback from UEs. In at least some embodiments, DyMo infers the optimal eMBMS MCS while meeting strict QoS requirements. For example, with only five reports per second, DyMo detects the eMBMS SNR experienced by the 0.1% percentile of the UE population with Root Mean Square Error (RMSE) of 0.5%, regardless of UE population size. Various other embodiments of the DyMo capability are discussed further below.

In at least some embodiments, DyMo may be configured to support monitoring of very large communication networks with limited communication overhead. Accordingly, embodiments of DyMo may be provided within various contexts.

In at least some embodiments, for example, DyMo may be configured to support cellular network monitoring. Mobile nodes in cellular networks can be configured to report their service conditions. Such configurations rarely change, due to the complexity of configuring each device separately. In at least some embodiments, $D_yMo$ can dynamically configure UEs based on their locations and monitoring needs in a manner that may eliminate the need for individual instructions to UEs. For example, within the cellular context, example use cases may include verifying the QoS provided by a given application in an area of interest or monitoring the DE movement patterns in a region for designing tracking areas.

In at least some embodiments, for example, DyMo may be configured to support IoT monitoring. Low cost sensors are being deployed at large scales for various applications. In at least some embodiments, DyMo can be efficiently used to configure and monitor such IoT systems without the need to keep track of each sensor. In at least some embodiments, DyMo can efficiently verify the network health at a given time by requesting that the sensors report their status (and location) with some probability.

It will be appreciated that various embodiments of DyMo may be configured to support monitoring of communication networks with limited communication overhead for various other types of communication networks.

Figure 5:
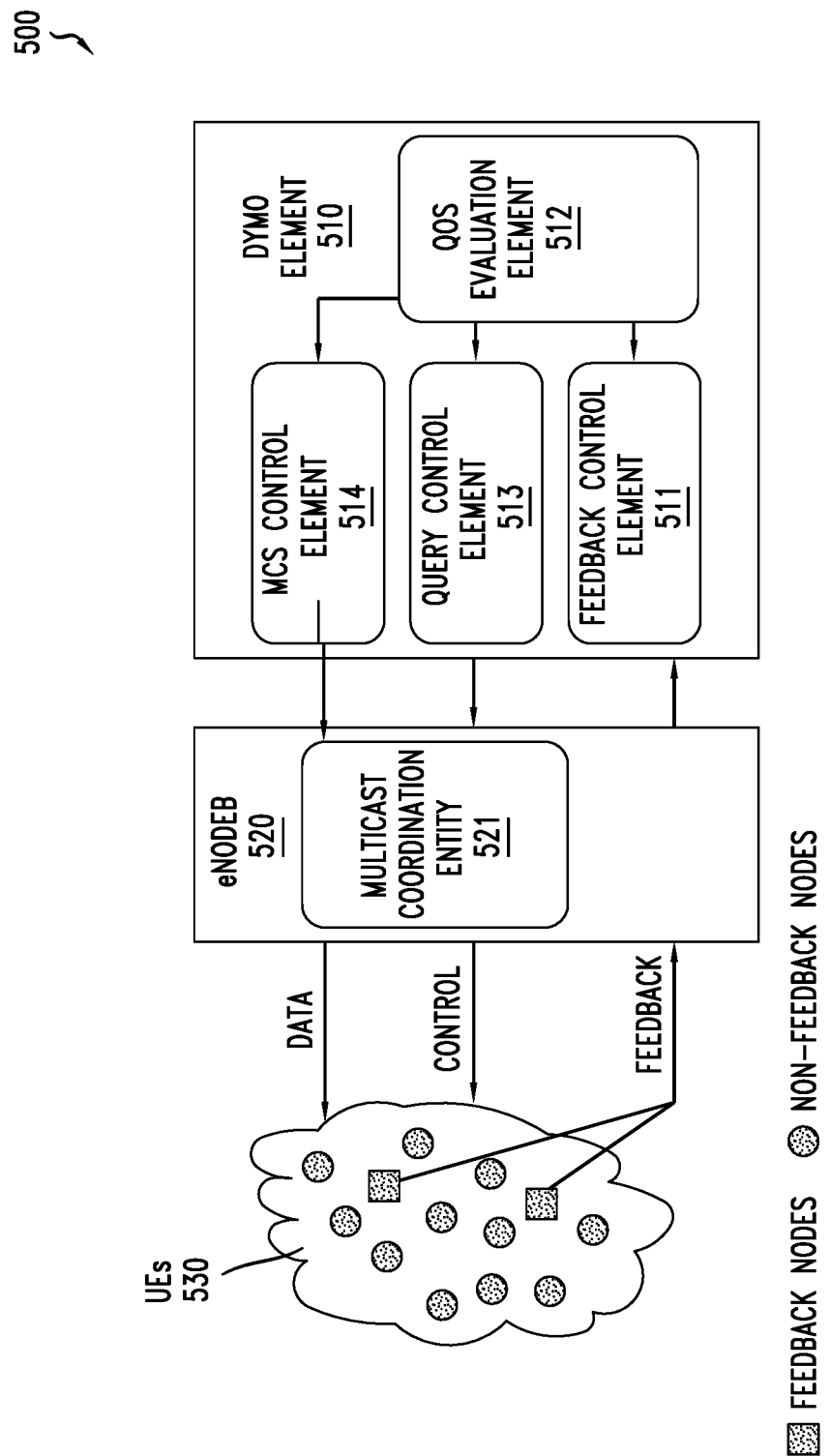
FIG. 5 depicts a cellular wireless network configured to support various embodiments of DyMo.

FIG. 5 depicts a cellular wireless network configured to support various embodiments of DyMo.

The cellular wireless network 500 includes a DyMo element 510, an eNodeB 520, and a set of UEs 530. The DyMo element 510, the eNodeB 520, and the UEs 530 may correspond to BMCE 120, WAD 130, and WEDs 140, respectively. The DyMo element 510 includes a feedback collection element (FCE) 511, a QoS evaluation element (QEE) 512, a query control element (QCE) 513, and an MCS control element (MCE) 514. The eNodeB 520 includes a multicast coordination entity (MCE) 521. The DyMo element 510 leverages the multicast capabilities of cellular wireless network 500, such as the LTE evolved Multimedia Broadcast/Multicast Service (LTE-eMBMS) for fast distribution of instructions and queries to large groups of UEs. Here, a query, which also may be referred to as a probabi-listic group instruction, is not addressed to a specific device, but, rather, includes information about a group of devices that satisfy some conditions and also specifies the required actions of the considered devices with some probability (i.e., the required actions are executed by each of the devices with the given probability if the specified conditions are satisfied) . As a result, only a subset of the UEs 530 become feedback nodes during any given reporting interval. This is illustrated in FIG. 5 using different shapes for the UEs 530: the square shaped UEs 530 have become feedback nodes, whereas the circle shaped UEs 530 have not become feedback nodes (e.g., either the specified conditions were not satisfied or the specified conditions were not satisfied but the UEs 530 did not become feedback nodes due to the application of the probability). It is noted that only a subset of the UEs 530 served by the eNodeB 520 may participate in DyMo (e.g., UEs 530 equipped with a DyMo user application may listen to predefined multicast channels on which the probabilistic group instructions are provided). The DyMo element 510 receives the feedback from the UEs 530 providing feedback and performs various evaluation and tuning functions based on the feedback.

Figure 6:
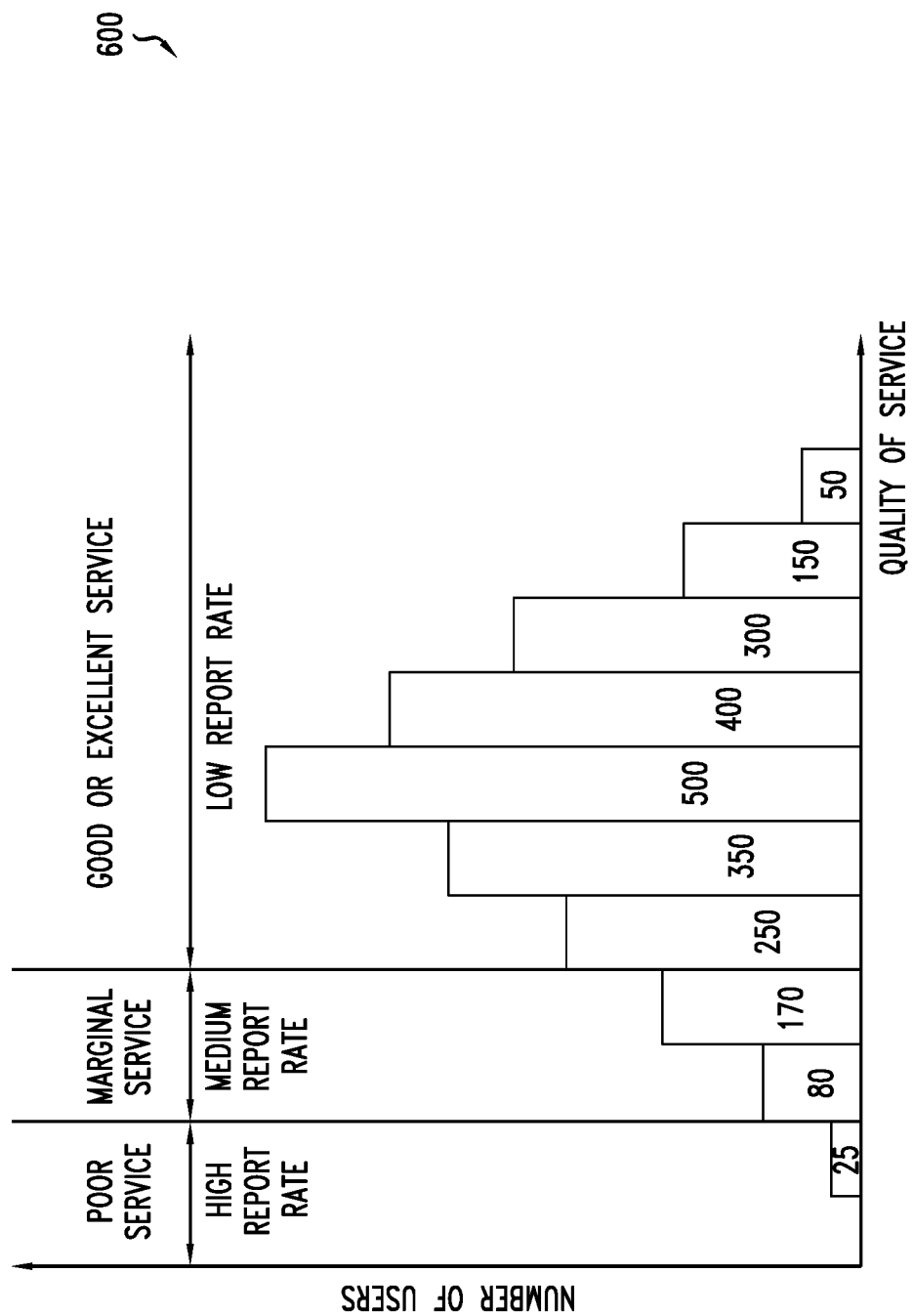
FIG. 6 depicts groupings of users based on quality-of-service and associated feedback reporting rates for the groupings of users.

In at least some embodiments, as discussed above, DyMo may be configured to support efficient video delivery to very large groups of UEs. By collecting small amount of QoS reports, DyMo may optimize the eMBMS system utilization, while ensuring that only a small predefined number of outliers, say 0.1% of the UEs, may suffer from poor service. Each QoS report provides the temporal eMBMS SNR observed by the reporting UE, termed a Feedback (FB) Node. DyMo may use these reports to approximate the SNR distribution of the UEs, as shown by FIG. 6. From the SNR distribution, DyMo may infer an SNR threshold such that the vast majority of the UEs experience high eMBMS SNR, e.g., 99.9%, and use this threshold for setting the optimal eMBMS parameters, such as the MCS and FEC codes. It is noted that DyMo may infer the SNR threshold even with very limited QoS reports. DyMo may dynamically divide the UEs into groups according to their SNR values. DyMo may use broadcast control messages in order to instruct the UEs with low SNR to report at a high rate, while instructing UEs that experience good QoS to report at a relatively low rate. This partitioning enables DyMo to accurately estimate the SNR threshold even with limited QoS reports.

In order to understand various embodiments of DyMo, DyMo is primarily presented within the context of an LTE-Advanced network with multiple base stations, referred to as eNodeBs (eNBs) providing eMBMS service to a large group of m user equipment (UEs), also termed eMBMS receivers, in a given venue. The eNBs define a single MBSFN set and the eMBMS service is provided and managed by a single Broadcast Multicast Service Center (BMSC). The multicast flows include FEC codes that allow the UEs to tolerate some level of losses (e.g., up to 5% packet losses, up to 7% packet losses, or the like). It is assumed that all UEs are capable of detecting and reporting the eMBMS service quality that they experience while they move. For reporting of the eMBMS service quality, time is divided into relatively short reporting intervals (e.g., one second each, a few seconds each, or the like) and it is assumed that the eMBMS SNR statistics of the UEs do not change during reporting intervals. It is also assumed that every UE v can infer an individual SNR value $h_v(t)$ such that at least 95% of the eMBMS packets are received by v with SNR above $h_v(t)$ during report interval t. It is noted that such information can be obtained using monitoring software (e.g., QxDM, Android LogCat, or the like). It is noted that, given an individual SNR value, $h_v$, there is a one-to-one mapping to appropriate eMBMS MCS such that, with FEC packets, the UE can decode all of the eMBMS packets.

In at least some embodiments, given an eMBMS system that provides services to a very large eMBMS receiver population (e.g., with m UEs on the order of tens of thousands of users), DyMo may be configured to provide a scalable and efficient eMBMS monitoring and control system that satisfies a QoS constraint and an overhead constraints. The QoS constraint may be defined as follows: given a QoS threshold $p \ll 1$, at most p fraction of the receivers may suffer from packet loss of more than a threshold (e.g., 5%, 7%, or the like). It is noted that this implies that, with FEC, a fraction 1−p of the eMBMS receiver population should receive all packets. It is noted that UEs that suffer from packet loss after FEC are referred to as outliers while the rest of the UEs are referred to as normal UEs. The overhead constraint may be defined as follows: the average number of UE reports during a report interval should be below a given overhead threshold r. In at least some embodiments, DyMo may be configured to achieve an objective of identifying at any given time t the maximal global SNR threshold s(t) as accurately as possible that satisfy the QoS and overhead constraints. In other words, the calculated SNR threshold s(t) needs to ensure that a fraction 1−p of the UEs have individual SNR values $h_v(t) \geq s(t)$. From SNR threshold s(t) it is possible to calculate the maximal eMBMS MCS that meets the QoS constraint and consequently maximize the network performance, either by reducing the resource blocks allocated to the eMBMS service or improving the video quality without increasing the allocated bandwidth.

It will be appreciated that, although primarily presented herein within the context of embodiments in which all of the eMBMS bearers of the area are set in the same manner (e.g., all UEs of the area are treated as a single group and the same settings are applied to each of the eMBMS bearers), in at least some embodiments the various eMBMS bearers of an area may be handled individually (e.g., different settings may be determined for respective eMBMS bearers for optimizing or attempting to optimize performance of the respective eMBMS bearers). It is noted that, while such embodiments may provide more fine-grained control over eMBMS performance it comes at the price of higher reporting overhead.

In at least some embodiments, DyMo may be configured to provide a generic monitoring scheme for large systems. In at least some embodiments, as discussed further below, DyMo may be configured to monitor and manage video delivery to very large groups of UEs in eMBMS video delivery systems.

In at least some embodiments, DyMo may be configured as a generic monitoring scheme for very large systems by supporting broadcasting of instructions, probabilistic group instructions, and report analysis capabilities.

In at least some embodiments, DyMo may be configured to leverage the broadcast capacities of wireless networks, e.g., LTE-eMBMS, for fast dissemination of instructions, also termed a queries, to a large population of mobile devices, referred to as UEs. This eliminates the need to keep track of each UE and to send individual messages to the UEs, thereby conserving various types of resources (e.g., processing resources, bandwidth resources, or the like).

In at least some embodiments, DyMo may be configured to support use of probabilistic group instructions. In general, a given instruction is targeted to a sub-group of UEs in a certain location that satisfies some given condition(s). The query instructs the UEs in this sub-group to perform a specific action with some probability in a given time duration. For instance, for eMBMS monitoring, DyMo may instruct all the UEs in a given venue with eMBMS SNR below some level (e.g., 10 dB, 12 dB, or the like) to send a status report with a given probability (e.g., 8%, 10%, 15%, or the like) during the next report interval. As a result, DyMo is not required to keep track of the UE locations or status, thereby conserving various types of resources (e.g., processing resources, bandwidth resources, or the like).

In at least some embodiments, DyMo may be configured to analyze the UE reports that are received responsive to the reporting instructions that are sent to the UEs. In at least some embodiments, DyMo may be configured to refine its reporting instructions, for achieving some objectives, based on analysis of UE reports. In at least some embodiments, DyMo may be configured to use the UE reports to infer the SNR threshold and creates a new set of instructions for the next reporting interval.

In at least some embodiments, DyMo, including the functions discussed above (namely, broadcast capabilities, probabilistic instructions, and report analysis) may be applied for eMBMS monitoring and parameter tuning. In at least some embodiments, DyMo may be configured to perform eMBMS monitoring and parameter tuning based on feedback control functions, QoS analysis functions, and parameter tuning (action control) functions. The feedback control functions, which are discussed in additional detail below, may include efficiently collecting QoS reports from UEs by using group instructions, in which a relatively small number of UEs (referred to as feedback (FB) nodes) are instructed to send QoS reports of their individual SNR values with some probability based on the QoS experienced by the UEs. For example, for collecting sufficient reports with relatively low communication overhead, the UEs that experience relatively low QoS send relatively frequent reports, while the other UEs send only relatively infrequent reports. The QoS analysis functions, which are discussed in additional detail below, may include using the UE feedback to estimate the distribution of the UE SNR values and using the estimated distribution of the UE SNR values to infer the global SNR threshold H. This information may then be used in order to decide the proper configuration of the eMBMS MCS in order to increase or maximize network performance while ensuring the QoS constraint. The parameter tuning (action control) functions, which are discussed in additional detail below, may include, after determining the desired or required eMBMS settings, reconfiguring the network components by sending appropriate work orders to the eMBMS provisioning mechanism. It is noted that DyMo may iteratively perform these tasks and refine the eMBMS parameters to cope with the dynamic nature of the network.

In at least some embodiments, as indicated above, DyMo may be configured to perform feedback control within the context of performing eMBMS monitoring and parameter tuning.

In general, DyMo enables collection of sufficient QoS reports from the UEs for accurately inferring system performance with low communication overhead. DyMo may include a Feedback (FB) Control mechanism in the network core and a DyMo Mobile-Application on each UE. The FB Control mechanism instructs the UEs as to both the required information (e.g., the SNR values) and the reporting rate, which may be given in the form of probabilistic instructions. The instructions are sent as broadcast messages to all the eMBMS receivers. This enables DyMo to control the amount of both downlink and uplink FB traffic during each report interval by selecting only a small fraction of the UEs as FB nodes.

In DyMo, the FB node selection may be performed using a quasi-distributed stochastic process in which DyMo instructs the UEs regarding the probability that any particular UE should be a FB node as a function of the QoS (e.g., eMBMS SNR) experienced by the UE. In response to received instructions, each UE independently determines whether it should serve as FB node at the current report interval. The process may be further understood by way of reference to the following example.

The FB node selection and UE reporting, as indicated above, may be further understood by way of reference to an example. Assume that a UE is deemed to experience poor QoS when its eMBMS SNR is below 10 dB, moderate QoS when its eMBMS SNR is between 10 to 15 dB, and good service when its eMBMS SNR is above 15 dB. Consider a system with 2275 UEs that are divided into three groups as shown in FIG. 6: (1) High-FB-Rate (H), which includes 25 UEs, less than 2.5% of the UEs, that experience SNR below 10 dB and, thus, suffer from poor service, (2) Medium-FB-Rate (M): which includes 250 UEs, about 10% of the UEs, with eMBMS SNR in the range [10, 15] dB that experience marginal service quality, and (3) Low-FB-Rate (L): 2000 UEs (About 87% of the UEs) with SNR above 15 dB that enjoy good service. In this example, at the beginning of each QoS report interval, with duration of 1 second, DyMo instructs the UEs regarding the probability that they should become FB nodes if their SNR is below a threshold. Each UE that becomes a selected FB node sends a single QoS report during the QoS report interval (or at the end of the QoS report interval) and then returns to operate as regular UE after the QoS report interval. Table 1 presents the selection probability of each UE group, the number of FB messages per second sent by each UE group and the average elapsed time (T) between two reports of the UEs of each UE group.

TABLE 1

| Group | Number of UEs | Selection Probability | Message Rate (per sec) | Sample Rate (per min) |
|---|---|---|---|---|
| H | 25 | 20% | 5 | 100% |
| M | 250 | 2% | 5 | ≈100% |
| L | 2000 | 0.25% | 5 | 15% |

It is noted that the latter can be modeled as a negative binomial distribution. Similar to this example with overall overhead of only 15 QoS report per second, it is shown further below that, even in dense UE population with tens of thousands of UEs, DyMo can instruct the UEs to send only a few QoS reports per second (from the entire population) and still get near optimum or even optimum performance. It will be appreciated that although primarily described with respect to a particular QoS report interval (namely, one second), shorter or longer report intervals may be used (e.g., half a second, a few seconds, or the like).

In at least some embodiments, as indicated above, DyMo may be configured to perform QoS evaluation within the context of performing eMBMS monitoring and parameter tuning.

The DyMo QoS evaluation mechanism may be configured to estimate the eMBMS SNR probability distribution of the UEs, such as is depicted in FIG. 6. It is noted that, in order to determine the eMBMS SNR threshold s(t), the estimation of left side (the low SNR range) of the distribution needs to be more accurate. To achieve this goal, the QoS evaluation mechanism divides the UEs into bins according to their eMBMS SNR values. The optimal value of the SNR threshold s(t) may then be inferred by getting more reports from UEs with low SNR. The boundary of these bins and their sizes (number of UEs) dynamically change according to the number of active eMBMS receivers and their motion. As such, as discussed further below, the QoS evaluation mechanism may perform certain tasks at each QoS reporting interval.

The DyMo QoS evaluation mechanism may be configured to determine the eMBMS SNR threshold s(t) by performing certain tasks at each QoS reporting interval. The DyMo QoS evaluation mechanism may be configured to, at the beginning of each QoS reporting interval, utilize the previously estimated SNR distribution to determine the number of bins, the SNR boundaries between the bins, and the UE report probability at each bin. Here, it is assumed that a single QoS report is received from each FB node that includes the individual SNR value of the FB node. This information is converted into probability instructions and sent to the UEs through the FB control mechanism. The DyMo QoS evaluation mechanism may be configured to, at the end of each QoS reporting interval, analyze the UE reports and infer the SNR distribution and, thus, the eMBMS SNR threshold s(t). The DyMo QoS evaluation mechanism also may be configured to determine an estimation for adapting the eMBMS system parameters and inform the eMBMS parameter tuning mechanism of the estimation for adapting the eMBMS system parameters. The DyMo QoS evaluation mechanism is discussed in additional detail below.

In at least some embodiments, as indicated above, DyMo may be configured to perform dynamic parameter tuning within the context of performing eMBMS monitoring and parameter tuning.

In at least some embodiments, DyMo may be configured to support coordinated parameter tuning. In coordinated parameter tuning, once the SNR threshold s(t) is selected, DyMo may tune the eMBMS parameters (e.g., eMBMS MCS or the like) accordingly (e.g., using commonly accepted mappings). It will be appreciated that, each time DyMo changes the eMBMS parameters, the consumption of wireless resources for the eMBMS service is affected as well. For example, before the eMBMS MCS index is reduced, the wireless resources should be increased or the video resolution should be reduced in order to match the content bandwidth requirements to the available wireless resources. It is noted that, since the eMBMS signal is a soft combination of the signals from all of the eNBs in the region (e.g., the venue or other region in which the service is provided), any change of eMBMS parameters is synchronized at all of those eNBs to avoid interruption of service. This synchronization may be based on the fact that all the clocks of the eNBs are synchronized. This synchronization may be performed based on the two phase commit protocol commonly used in distributed databases.

In at least some embodiments, DyMo may be configured to support initial eMBMS MCS setting. In at least some embodiments, DyMo may use an iterative mechanism to tune the eMBMS parameters like the MCS index. The choice of the initial MCS setting is important. As previously mentioned, in a given MBSFN area, the out-of-cell interference in unicast may become a useful signal in eMBMS. In general, the unicast SINR is a lower bound to the eMBMS SINR. Accordingly, in at least some embodiments, the unicast SINR (which is already available as a part of the existing feedback in unicast) as the initial MCS setting for the DyMo iterations.

In at least some embodiments, DyMo may be configured to estimate the SNR threshold, s(t), for a given QoS constraint (p) and overhead constraint (r). In particular, various embodiments of DyMo may be configured to address various challenges of partitioning the SNR distribution into bins, including determining the bin boundaries and the report rate from the UEs in each bin, such that the overall estimation error of the SNR threshold s(t) is minimized. As discussed further below, the estimation of the SNR threshold s(t) may be configured for use in static settings (e.g., where the UE SNR values are fixed) or may be configured for use in dynamic settings (e.g., dynamic environments with UE mobility).

In at least some embodiments, DyMo may be configured to estimate the SNR threshold, s(t), using order statistics. For example, this may be used by DyMo for determining the initial SNR distribution in a first iteration using a single bin. This may be based on some known statistical results in quantile estimation. Here, let F(x) be a cumulative distribution function (CDF) for a random variable X. The quantile function $F^{-1}(p)$ is given by: $\inf\{x|F(x) \geq p\}$. Let $X_1, X_2, \ldots, X_r$ be a sample from the distribution F, and $F_r$ its empirical distribution function. It will be appreciated that the empirical quantile $F_r^{-1}(p)$ converges to the population quantile $F^{-1}(p)$ at all points p where $F^{-1}$ is continuous. Also, the true quantile $F(F_r^{-1}(p))$ of the empirical quantile estimate $F_r^{-1}(p)$ is asymptotically normal with mean p and variance $p(1-p)/r$. Here, in order to estimate the SNR threshold, s(t), p is the SNR distribution of all UEs. A direct way to estimate the SNR threshold s(t) is to collect QoS reports from r randomly selected UEs from the population of UEs, and calculate the empirical quantile $F_r^{-1}(p)$ as the estimate of the SNR threshold s(t). It is noted that, since F can have, at most, m points of discontinuity, it may be assumed that p is a point of continuity for $F^{-1}$ in order to enable normal approximation and, even if p is found not to be a point of continuity for $F^{-1}$, then p may be perturbed by an infinitesimal amount in order to make it a point of continuity for $F^{-1}$.

In at least some embodiments of DyMo, a two-step estimation process or algorithm may be used to estimate the SNR threshold s(t). The two-step estimation process may use two bins for estimating the SNR threshold, s, in a static settings assuming a fix number of UEs, m, and a bound r on the number of expected reports. With DyMo, there is no requirement that reports be collected uniformly from all UEs. Rather, DyMo may be configured to use probabilistic group instructions to improve the accuracy of SNR threshold estimation. This may be realized by performing a two-step estimation that approximates the shape of the SNR distribution before focusing on the low quantile tail.

In at least some embodiments, an estimation process or algorithm may be configured to provide a two-step estimation of the SNR threshold s(t) for a static case. The two-step estimation process may include two initialization steps of (1) selecting $p_1$ and $p_2$ such that $p_1 p_2 = p$ (and $p_1$ is used as the percentile boundary for defining the two bins) and (2) selecting the number of reports $r_1$ and $r_2$ for each step such that $r_1 + r_2 = r$. The two-step estimation process also may include two report requesting steps (the reason that this process is referred to as a two-step process) of (1) asking all UEs to send QoS reports with probability $r_1/m$ and using these reports to estimate the p quantile $\hat{x}_1 = F_{r_1}^{-1}(p_1)$ and (2) asking UEs with SNR values below $\hat{x}_1$ to send reports with probability $r_2/(p_1 \cdot m)$ and calculating the $p_2$ quantile $\hat{x}_2 = G_{r_2}^{-1}(p_2)$ as an estimation for SNR threshold s(t) (G is the CDF of the subpopulation with SNR below $\hat{x}_1$). As indicated above, this is considered a two-step process because there are two steps that involve the sending of requests for QoS reports to UEs.

In at least some such embodiments, in order to simplify the notation used above, assume that $r_1$ and $r_2$ also denote the expected number of reports at each of the two steps, respectively. By $p(1-p)/r$, it may be determined that $\hat{p}_1 = F^{-1}(\hat{x}_1)$ and $\hat{p}_2 = G^{-1}(\hat{x}_2)$ are unbiased estimators of p1 and p2 with variance $p_1(1-p_1)/r_1$ and $p_2(1-p_2)/r_2$, respectively. The estimate $\hat{x}_2$ has true quantile $\hat{p}_1 \hat{p}_2$ in the population. Assume that $\hat{p}_1$ is less than $p_1 + \in_1$ and that $\hat{p}_2$ is less than $p_2 + \in_2$ with high probability (for example, $\in_1$ and $\in_2$ may be taken to be three times the standard error for >99.8% probability). Then, the over-estimation error is bounded by $(p_1 + \in_1)(p_2 + \in_2) - p = p_1 p_2 + \in_1 p_2 + \in_2 p_1 + \in_1 \in_2 - p \approx \in_1 p_2 + \in_2 p_1$ (and it is noted that the case for under-estimation is similar). The small higher order term $\in_1 \in_2$ may be ignored. By using symmetry arguments it can be shown that the error is minimized by taking $$p_1 = p_2 = \sqrt{p}, \text{ and}$$
$$r_1 = r_2 = \frac{r}{2}$$

so that $$\in_1 = \in_2 = 3\sqrt{\sqrt{p} - \sqrt{p}}/(r/2).$$

The following proposition (denoted herein as Proposition DyMo-1) may then be considered: the distance between p and the quantile of the two-step estimator $\hat{x}_2$, $\hat{p} = F^{-1}(x_2)$, is approximately bounded by $$6\sqrt{2}\sqrt{\frac{p\sqrt{p}(1-\sqrt{p})}{r}}$$

with probability at least $1 - 2(1 - \Phi(3)) > 99.6\%$, where $\Phi$ is the normal CDF. Then, compare this against the bound of 3 standard error in the direct order statistics case $3\sqrt{p(1-p)/r}$. With some calculations, it may be shown that, if $p \leq 1/49 \approx 2\%$, the 2-step estimation has smaller error than the direct method. Namely, the direct method has error of order $\sqrt{p}/\sqrt{r}$, while the two-step estimation method has error of order $p^{3/4}/\sqrt{r}$. It will be appreciated that, since $p \ll 1$, the difference can be significant. This is validated by a simulation on estimating the first percentile of the uniform distribution on [0, 1] using r=400 samples over population size of $10^6$. The two-step estimation has smaller standard error compared to direct estimation.

It will be appreciated that, although primarily presented with respect to embodiments in which two bins are used, more than two bins may be used (e.g., embodiments presented within the context of supporting two bins may be generalized to three or more telescoping bin sizes, although it is noted that p will need to be much smaller for these sampling schemes to achieve sample savings (one of the reasons that embodiments are primarily presented with respect to use of two bins using a 2-step estimation, rather than 3+ bins using 3+ steps).

In at least some embodiments, an estimation process or algorithm may be configured to provide a two-step estimation of the SNR threshold s(t) for a dynamic case.

In the dynamic case, DyMo may use the previous estimate of the SNR threshold from the previous reporting interval s(t−1) in order to estimate the SNR threshold s(t) at the end of the current reporting interval t. First, it is assumed that the total number of UEs, m, is known. Second, it is assumed that a current estimate $\hat{x}$ of the SNR threshold s(t) is known and that it is necessary or desirable to continue to monitor the SNR threshold s(t) as it changes over time. Here, suppose that the SNR of each UE, $h_v(t)$, can only have bounded change over a bounded time interval. More formally, it is assumed that $|h_v(t_1)-h_v(t_2)| \le L|t_1-t_2|$, where L is a Lipschitz constant for SNR changes. For example, it may be assumed that the UEs cannot have their SNR change by more than 5 dB during a report interval (e.g., 12 seconds or any other suitable reporting interval). This implies that, within 12 seconds, only UEs with SNR below $\hat{x}+5$ dB can affect the estimation of the p quantile (subject to small estimation error present in $\hat{x}$). It is noted that it is only necessary to monitor UEs that have SNRs below $x_L=\hat{x}+L$. It is noted that the true quantile of $x_L$, defined by $F^{-1}(x_L)$, is denoted as $p_L$. Here, it is necessary or desirable to apply the same two-step estimation process as discussed above for the static case while focusing on UEs with SNR below $x_L$; however, an estimate of $p_L$ is needed first. In this process, the previous SNR distribution may be used to estimate $p_L$ and those UEs that have SNRs below $x_L=\hat{x}+L$ may be asked to send quality reports at a rate $q=r/(p_L \cdot m)$. It is noted that, letting Y be the number of reports received in one time step, then Y/mq may be used as an updated estimator for $p_L$. It is further noted that this estimator is unbiased and has variance $$\frac{p_L}{m}\frac{1-q}{q}.$$

In the dynamic case, DyMo may use an iterative estimation of the SNR threshold. The iterative estimation of the SNR threshold may be based on an iterative two-step estimation process that includes two report requesting steps (the reason that this process is referred to as a two-step process) of (1) ask UEs with SNRs below $\hat{x}+L$ to send QoS reports at a rate q and construct an estimator $\hat{p}_L$ of $p_L$ from the number of received reports Y and (2) set $p'=p/\hat{p}_L$, and find the p' quantile $x'=G_Y^{-1}(p')$ and report it as the p quantile of the entire population (G is the CDF of the subpopulation of UEs having SNRs below $\hat{x}+L$). This is considered a two-step process because there are two steps that involve the sending of requests for QoS reports to UEs.

In at least some such embodiments, in order to simplify the notation, suppose that the estimation error of $p_L$ is bounded by $\in_1$ and that the estimation error of $p'=p/\hat{p}_L$ is bounded by $\in_2$ with high probability. Then, the estimation error is $$\left(\frac{p}{\hat{p}_L} \pm \in_2\right)p_L - p = \left(\frac{p}{p_L \pm \in_1} \pm \in_2\right)p_L - p.$$

The over-estimation error is bounded by $$\frac{p}{p_L - \in_1} \in_1 + p_L \in_2.$$

If it is assumed that $p_L - \in_1 \ge p$ (it is known, by the Lipschitz assumption, that $p_L \ge p$), then the bound can be simplified to $\in_1 + p_L \in_2$. It is noted that the same bound also works for the under-estimation error. If r is also used to denote the expected number of samples collected, then $r=p_L mq$. The standard error of $\hat{p}_L$ can be written as $$\sqrt{\frac{p_L}{m}\frac{1-q}{q}} = \sqrt{\frac{p_L^2}{r}\left(1 - \frac{r}{p_L m}\right)} < \frac{p_L}{\sqrt{r}},$$

and $\in_1$ may be taken to be $3p_L/\sqrt{r}$ so that the error of $\hat{p}_L$ is less than $\in_1$ with probability at least $\Phi(3)$. Since, as discussed above, it is assumed that $\hat{p}_L - \in_1 \ge p$, this implies $(1-3/\sqrt{r})p_L \ge p$. If $r \ge 100$, then this implies that $p < 0.7 p_L$ will satisfy the requirement. The standard error of estimating the $p'=p/\hat{p}_L$ quantile is approximately $$\sqrt{\frac{1}{Y}\frac{p}{\hat{p}_L}\left(1 - \frac{p}{\hat{p}_L}\right)} \le \frac{1}{2\sqrt{Y}},$$

using the fact that $x(1-x) \le 1/4$ for $x \in [0,1]$ and that Y is the number of reports received (a random variable). If the expected number of reports r is reasonably large ($\ge 100$, say), then Y can be well approximated by a normal and $Y \ge 0.7r$ with high probability $\Phi(3)$. Then, $$\sqrt{\frac{1}{Y}\frac{p}{\hat{p}_L}\left(1 - \frac{p}{\hat{p}_L}\right)} \le \frac{1}{2\sqrt{Y}}$$

is bounded by $1/\sqrt{r}$ with high probability ($\Phi(3)$), and $\in_2$ may be taken to be $3/\sqrt{r}$. Then, plugging these back into $$\frac{p}{p_L - \in_1} \in_1 + p_L \in_2,$$

the following proposition (denoted herein as Proposition DyMo-2) may then be obtained: the distance between p and the quantile of the estimator x, $\hat{p}=F^{-1}(x')$, is approximately bounded b $$6\frac{p_L}{\sqrt{r}}$$

with probability at least $1-2(1-\Phi 3)) > 99.6\%$, if the expected sample size $r \ge 100$ and $p \le 0.7 p_L$. This shows that the error is of order $p_L/\sqrt{r}$. Compared to the error of order $$p^{\frac{3}{4}}/\sqrt{r}$$

in the static two-step estimation process, it may be seen that the estimation error can be smaller if $p_L$ is small (i.e., the SNR of individual users do not change much in a unit time step).

In at least some embodiments, exponential smoothing may be applied when estimating the SNR threshold s(t). In order to smooth the estimates of the SNR threshold s(t) while taking into account older reports, the exponential smoothing $s(t)=\alpha \hat{x}(t)+(1-\alpha)s(t-1)$ may be applied, where $\hat{x}(t)$ is the new raw SNR threshold estimate using the dynamic two-step estimation above and s(t−1) is the SNR threshold from the previous reporting interval. In at least some such embodiments, α is taken to be 0.5 in order to allow some re-use of past samples without letting them to have too strong an effect on the estimates of the SNR threshold s(t) (e.g., samples older than six reporting intervals have less than 2% weighting (1/64)), samples older than seven reporting intervals have less than 1% weighting (1/128), or the like).

In at least some embodiments, DyMo may be configured to estimate the total number of UEs (m). In at least some embodiments, if the total number of UEs m is not known ahead of time or changes dynamically, the number of UEs m may be estimated by triggering UEs above the threshold $\hat{x}+L$ to also send reports. In at least some such embodiments, these UEs can send reports at a lower rate, as the value of m is not expected to change rapidly. Similar to the two-step estimation process discussed above, $r_1=r_2=r/2$ reports may be allocated to each bin. The errors in estimating the total number of UEs m will contribute to the error $\in_1$ in the estimation of $p_L$ in $$\frac{p}{p_L - \in_1} \in_1 + p_L \in_2 \ldots$$

It is noted that the error analysis in this case is largely similar and, thus, is omitted here.

It will be appreciated, at least from the embodiments and associated analysis provided above, that DyMo may be configured to provide accurate estimation of SNR threshold s(t).

The performance of various embodiments of DyMo may be evaluated in a number of ways. The performance of embodiments of DyMo may be evaluated with various numbers of UEs (m), various QoS thresholds (p), and various overhead constraint (r). In the results presented, a dynamic environment, with UE mobility and changing number of active eMBMS receivers, is simulated.

The following two variants of DyMo are considered: (1) DyMo-Known (this variant has full information of the number of active eMBMS receivers at any time) and (2) DyMo-Estimate (this version needs to estimate the number of active eMBMS receivers from its measurements). Both variants use bin size of $0.5 \cdot \sqrt{p}$ for estimating the SNR distribution.

The performance of DyMo is also compared to four other approaches, which include optimal (full knowledge of the UEs SNR values at any time and, thus, accurate information of the SNR distribution, uniform (static eMBMS settings while assuming full knowledge of the SNR characteristics and uniform UE distribution), and two variants of order-statistics. In general, order statistics are based on estimation of the SNR threshold based on random sampling. The active eMBMS receivers send reports with a fixed probability of 2r/m per second (assuming that half of the UEs, i.e., m/2, are active eMBMS receivers). This might be the best possible approach without using broadcast messages for UE configuration. The UEs can be configured one time initially (and the overhead of this initial configuration is ignored in this evaluation). The first variant of order statistics is order statistics without history (which ignores SNR measurements from earlier report intervals) and the second variant of order statistics is order statistics (which takes into account the history of SNR reports). It is noted that both DyMo and order statistics with history may perform the same exponential smoothing process for assigning weights to the measurements from previous report intervals with a smoothing factor of α=0.5.

In this evaluation, the following metrics are used in order to evaluate performance of the considered schemes: (1) accuracy, (2) QoS constraint violation, and (3) overhead constraint violation. With respect to accuracy, it is noted that this is the accuracy of the SNR threshold estimation s(t). After calculating s(t), the actual SNR threshold percentile in the accurate SNR distribution is checked. This metric provides the percentile of active eMBMS receivers with individual SNR values below s(t). It is noted that this also considers the ability of the scheme to adapt quickly to changes in the number of active eMBMS receivers and their SNR values. With respect to the QoS constraint violation, it is noted that this is the number of outliers above the QoS threshold p. With respect to the overhead constraint violation, it is noted that this is the number of reports above the overhead threshold r.

In this evaluation, the evaluation is based on simulation of a stadium-like venue that includes the stadium itself and its vicinity. The simulation environment is based on actual eMBMS radio measurements collected inside and in the vicinity of a big stadium. The measurements showed a significant discrepancy in service between different locations e.g., the service is much better inside the stadium. To capture the service quality appropriately, the stadium environment was divided into squares of 10 m×10 m. The standard deviation of the SNR differences within each geographical area is roughly 5 dBs and the distribution of SNR is close to Gaussian. However, the areas themselves have different SNR mean values. For the purpose of these evaluations, the SNR values of the UEs are determined based on the SNR distribution of the geographical area of their locations. The evaluation is based on an assumption of a mobility pattern in which the UEs move from edges to the center in 12 minutes, stay at the center for 3 minutes, and then go back to the edges. It is noted that, as the UEs move toward the center, the number of active eMBMS receivers gradually increases from 10% of the UEs to 100% and then declines again as they move to the edges.

In this evaluation, the overall simulation time is 30 minutes, with five report intervals per minute (each one of 12 seconds). For DyMo and the order-statistics variants, some active eMBMS receivers send their SNR values at each reporting interval. The accuracy of each SNR report is assumed to be 0.1 db. This means that the SNR distribution of UEs is a discrete function.

In this evaluation, performance over time is considered and evaluated. More specifically, performance over time is considered and evaluated for the different schemes for a given instance with m=20,000 UEs, QoS constraint p=0.1%, and overhead constraint r=5 reports/second (i.e., 60 messages per 12 second report interval). Recall that the QoS requirement p is defined relative to the current number of active eMBMS receivers and not to m. In this case, the number of permitted outliers is at most 20 at any given time.

In this evaluation, it was determined that both variants of DyMo being evaluated can accurately infer the SNR threshold with an estimation error of at most 0.1%, whereas the order statistics variants suffered from much higher estimation error on the order of a few percentages. This performance gap translates to different estimation quality of the SNR threshold. However, it is noted that a more instructive metric to understand the effect of SNR threshold is the spectral efficiency which, here, is defined as the number of bits transmitted per second per hertz of the frequency spectrum and is a function of the eMBMS MCS determined from SNR threshold mapping. In this evaluation, it was determined that DyMo achieves near optimal spectral efficiency and results in negligible violation of the QoS constraint (which both DyMo variants achieving similar results). This indicates that, even with a rough estimation of the number of active eMBMS receivers, DyMo can accurately estimate the SNR threshold. By contrast, while the order-statistics schemes yielded relatively good spectral efficiency at times, the order statistics variants also yielded inaccurate eMBMS MCS settings (which results in an excessive number of outliers). Given that the permitted number of outliers is at most twenty, the order statistics with history and order statistics without history schemes exceed this value, sometimes by a factor of 10 and 20, respectively. Among the two order statistics variants, the order statistics with history variable satisfies the constraints better. In this example, the uniform scheme yields a very conservative eMBMS MCS setting, although it maintains a very low number of outliers and, thus, causes low network utilization. Additionally, the DyMo and order statistics schemes only resulted in mild violation of the overhead constraint.

In this evaluation, the impact of the various parameters is considered and evaluated. Namely, the quality of the SNR threshold estimation and the reliability of not exceeding the overhead constraint are evaluated for different schemes for various settings. The same configuration of m=20,000 UEs, p=0.1%, and r=5 reports/second was used, and the impact of changing the parameters one at a time was evaluated. In these examples, DyMo is compared only with the optimal scheme and with the order statistics with history scheme. It was determined that the root mean square error (RMSE) in the SNR threshold estimation of DyMo is close to that of the optimal scheme regardless of the number of UEs. It also was determined that DyMo outperforms the alternative solutions as p increases. Namely, as p increases, an increasing quantization error was observed, which impacts the RMSE of all of the schemes including the optimal scheme. It also was determined that, even with ten times higher reporting rate, DyMo significantly outperforms the order statistics variants. The RMSE in SNR threshold percentile for order statistics is the order of the required average 0.1 even with a permitted overhead of fifty reports. It is noted that there is a significant difference between an order of magnitude difference in reporting rates. Higher reporting rates lead to consumption of uplink resources, which require scheduling resources like uplink grants. Unlike the downlink, uplink resources are not reserved for eMBMS systems and, thus, take away resources from unicast services. It also was determined that the RMSE of the number of outliers is qualitatively similar to the SNR threshold percentile results. It also was determined that DyMo has lower RMSE as compared to order statistics for both RMSE of overhead versus m and overhead RMSE as SLA requirement p changes. It also was determined that while the RMSE for order statistics schemes scales almost linearly with the permitted overhead, the RMSE for DyMo is small for all cases. It also was determined that various embodiments of DyMo may achieve accurate, close to optimal, estimation of the SNR threshold even when the number of active UEs is unknown, can improve the spectral efficiency for eMBMS operation while adding a low reporting overhead, and can predict the SNR threshold with lower errors than other alternatives under a wide range of SNR threshold requirement p and reporting overhead constraint r.

In at least some embodiments, as discussed above, DyMo may be configured to support monitoring of very large communication networks with limited communication overhead. In at least some embodiments, DyMo is configured to support broadcasting of probabilistic group instructions to a large population of nodes for collecting required information with very limited communication overhead. In at least some embodiments, DyMo may be configured to support monitoring and parameter tuning of very large eMBMS systems. In at least some embodiments, DyMo may be configured to support efficient algorithms for identifying an appropriate eMBMS SNR threshold, such that only small predefined number of outliers may suffer from poor service. In at least some such embodiments, the algorithms may be configured to dynamically partition the UEs into groups according to their SNR values in a way that minimizes the estimation error while meeting a tight communication overhead budget. Various embodiments of DyMo are configured to infer the optimal SNR threshold with very small error and limited number of QoS reports. For example, when estimating the 1% percentile, only 400 reports are required to limit the standard error to 0.3% for each re-estimation. In practice the number of reports required is even smaller because reports from previous reporting intervals can be reused. Various embodiments of DyMo accurately infer the SNR threshold and optimizes the eMBMS parameters.

Various embodiments of DyMo may overcome various disadvantages typically associated with video multicast monitoring (including video multicast monitoring in eMBMS systems). As discussed herein, various embodiments of DyMo are primarily discussed herein within the context of monitoring the performance of LTE-eMBMS for video multicasting to numerous users in crowded places. Video delivery is an important service for wireless networks. However, in crowded venues, individual video streaming to a large population of UEs over LTE typically requires a dense deployment of BSs and, thus, high capital and operational expenditures. It is noted that, since existing LTE-eMBMS networks provide unidirectional multicast service without receiving QoS reports, the design and deployment of eMBMS based systems typically is challenging due to extensive and time consuming radio surveys, use of conservative parameter settings, a lack of handling of environmental changes, and so forth. Various embodiments of DyMo may overcome such challenges. However, these challenges associated with existing eMBMS systems also may be addressed via dynamic tuning of eMBMS parameters based on UE feedback. A key challenge with designing a multicast parameter tuning system that supports very large groups is to obtain accurate QoS reports with low overhead. For example, current approaches do not scale to very large groups (e.g., with tens of thousands of UEs) due to the following reasons: (1) most schemes select an MCS that satisfies the receiver that has the worst channel condition and, as a result, in crowded venues, a few unpredictable outliers may suffer from atypically low SNR and, thus, preclude high utilization in order to ensure reliable delivery to all UEs and (2) it is impractical to continuously collect QoS reports from all or most UEs without hampering the network performance (e.g., frequent QoS reports from all UEs may severely congest the uplink traffic, while infrequent reports may not be sufficient for timely detection of service quality changes). As discussed herein, various embodiments of DyMo may overcome such disadvantages of eMBMS-based systems by providing an efficient eMBMS monitoring and parameter tuning scheme that is configured to converge quickly to the optimal eMBMS configuration, obviate the need for service planning and extensive field trials, react quickly to environmental changes, and so forth. Various embodiments of DyMo, by supporting efficient collection of UE feedback and improved or even optimized parameter tuning, may provide attractive monitoring and querying solutions for many large scale wireless systems.

Various embodiments of DyMo may outperform or even significantly outperform order statistics based methods for inferring the SNR threshold. For example, with only 5 messages per second (60 per report interval), DyMo detects the eMBMS SNR value of 0.1% percentile with RMSE of 0.05%, which is at least 8 times better than order statistics based methods. Similarly, for example, DyMo infers the optimal SNR threshold with RMSE of 0.3 dB regardless of the DE population size, while the error of the best order statistic method was above 1 dB. As a result, DyMo violated the outlier bound (of 0.1%) with RMSE of at most 0.35 while the best order statistic method incurred RMSE of over four times the permitted number of outliers.

Various embodiments of DyMo may be configured to support broadcasting of instructions, use of probabilistic group instructions, analysis of feedback reports, or the like, as well as various combinations thereof. Various embodiments of DyMo may be configured to leverage the broadcast capacity of wireless networks (e.g., LTE-eMBMS, IEEE 802.11, or the like) for fast dissemination of instructions to a large population of UEs, thereby eliminating the need to keep track of the location of each UE and to send individual messages. Various embodiments of DyMo may be configured to support use of probabilistic group instructions in which each instruction is targeted to a sub-group of UEs in a certain location that satisfies some given condition or conditions. The query instructs the UEs in this group to perform a specific action with some probability in a given time duration. For instance, for eMBMS monitoring, DyMo may instructs the UEs that are within a given venue and which have eMBMS SNR below some level (e.g., 10 dB, 12 dB, or the like) to send status report with a given probability (e.g., 10%, 20%, or the like) during the next report interval. As such, DyMo may not need to keep track of the UE locations nor to keep record of their status. Various embodiments of DyMo may be configured to, at a predefined rate (e.g., after each reporting interval) analyze the reports from the UEs and generate instructions for achieving some objectives (e.g., changing the configuration of a provided service).

Various embodiments of DyMo may be provided using various architecture components. Various embodiments of DyMo may be provided using a monitoring server on the network side (which may be referred to as DyMo-server) and monitoring software on the UEs (which may be referred to as DyMo-App). The DyMo server may be configured to distribute broadcast Instructions to the UEs, collect the responses from the UEs, analyze the responses from the UE, and make decisions based on the analysis for meeting some objectives. The DyMo-server can be realized as an independent server in the network core, a server that runs in a cloud environment, or the like. The DyMo-server may include a feedback control element configured to send instructions to the UEs (e.g., using an instruction control element) and collect the responses of the UEs (e.g., using a feedback collation element). The instructions are sent to the appropriate wireless access devices (e.g., base stations, WiFi access points, or the like), which may broadcast the instructions to the UEs. The UE replies are sent as unicast messages to the feedback collation element. The DyMo-server may include an analysis element configured to analyze the UE reports (e.g., using a UE report analysis element) and based, on this analysis, send new instructions to the UEs (e.g., by invoking the feedback control element). The analysis element also may be configured to send a synopsis of the UE reports to a decision element, which produces reports and may decide to invoke some external dynamic configuration mechanism. The DyMo-App is monitoring software, running on a Us, that receives DyMo instructions, executes the DyMo instructions (e.g., involving measurement of the system performance or other types of tasks which may be performed by the UE based on DyMo instructions), and sends a response to the DyMo-server.

Various embodiments of DyMo may be configured to use instructions and reports which may include various types of information, which may be structured or formatted in various ways, or the like, as well as various combinations thereof. In at least some embodiments, DyMo instructions sent by the DyMo-server to the DyMo-Apps running on the UEs may include some or all of the following fields or information: (1) identification information, which may include an identifier of a monitoring application (e.g., where DyMo may be used for multiple monitoring applications), a identifier of a target group (e.g., a group of UEs) to which the instruction is targeted, or the like, (2) location information, such as a location where the monitoring application is to be used (e.g., for coverage verification in a wireless network, the geographic location or network location where the coverage is questionable and, thus, reports are to be collected), (3) monitoring time period information indicative of the time at which and time duration during which the monitoring application is to be used to collect information to be reported, (4) trigger information indicative as to the condition or conditions which, when satisfied, will or may (depending on whether collection of information is probabilistic) result in the collection of information to be reported (e.g., SNR at the UE being below 5 dB or any other types of conditions), (5) monitoring instruction information indicative as to one or more actions to be performed by the UE if the conditions of the trigger information are satisfied, the associated probability or probabilities with which the one or more actions are to be performed by the UE if the conditions of the trigger information are satisfied, and the monitoring time period (e.g., the instruction may be to send the UE SNR estimation and GPS location with a probability of 20% at a report interval of 10 seconds), and (6) a reporting rules (e.g., the required information to be reported, the report format for the report, or the like). It will be appreciated that DyMo instructions may include less or more information, that the information of the instructions may be organized in other ways, or the like, as well as various combinations thereof.

Various embodiments of DyMo may be used by various applications, may be used for a variety of network monitoring and management tasks, or the like, as well as various combinations thereof.

For example, various embodiments of DyMo may be configured to support multicast service monitoring. LTE-eMBMS has gained attention as an attractive solution for video delivery to very large groups in crowded areas. However, eMBMS system deployment is challenging due to the lack of real-time feedback from the UEs. As a result, each eMBMS deployment requires an extensive field trail or the service is provided without QoS guarantees and with limited resource utilization due to the usage of conservative MCS. Various embodiments of DyMo may be configured to offers a simple and effective solution to optimize the LTE-eMBMS network performance, while ensuring high service quality to the UEs. Various embodiments of DyMo may leverages an eMBMS channel for broadcasting stochastic instructions to the eMBMS receivers. The instructions allow DyMo to learn the service quality distribution with desired accuracy by partitioning the UEs into group such that UEs at different groups reports with different rates (e.g., UEs that suffer from poor service report with high rate, while UEs that benefit from high service quality report with very low rate). This type of separation allows DyMo to infer a few outliers that suffer from poor service and to tune the multicast system parameters accordingly.

For example, various embodiments of DyMo may be configured to support cellular network monitoring. Mobile devices in cellular networks can be configured to report about the service conditions based on MDT. Such configurations change rarely due to the complexity of configuring each device separately. Various embodiments of DyMo can dynamically configure UEs based on their locations and monitoring needs, thereby eliminating the need for individual instructions. Example use cases can be to verify the QoS that is provided by a given application in an area of interest or to monitor the UE movement patterns in a region for designing tracking areas. DyMo can also be efficiently used to suppress transmission of unnecessary information in conjunction with cellular network monitoring. For example, consider a failure in the cellular network that impacts a given region. After a few UEs report the problem then the problem is known and, thus, there is no need for additional reports of the problem from other UEs. However, since all of the UEs are configured to report about poor service areas, all the UEs in the affected region will continue to send updates even though the additional information is not required, unnecessarily consuming the already limited wireless resources in the affected region. DyMo can be efficiently used to suppress transmission of unnecessary information by an instruction to all the UEs in the affected area to suppress their reports while they are in the affected area.

For example, various embodiments of DyMo may be configured to support IoT monitoring. Low cost sensors are being deployed at large scales for various applications. DyMo can be efficiently used to configure and monitor such systems without the need to keep track of each sensor. DyMo can efficiently verify the network health at a given time by asking the sensors to report their status (and location) with some probability. DyMo can also reduce false alarms by broadcasting instructs to sensors in a given location to report their reading values.

For example, various embodiments of DyMo may be configured to support location aware mobile applications. For example, DyMo may be used to track the locations of nearby physicians in the case of an emergency. For example, consider the case of a medical emergency in which a physician with a specific expertise, say X, is required. Assume that many physicians have the appropriate DyMo-enabled application for medical emergency, however the system does not keep track of their locations and expertise. Once the DyMo-Server is informed about the situation and its location, say location Y, it can broadcast the following query "Any physician with expertise X that is located in distance at most 500 meter from location Y, please report immediately"}. Once the DyMo-App of such a physician receive this query, it informs the user about the situation. If the server does not receive any response within a few seconds, it can increase the search area or consider other medical professionals. It is noted that the foregoing example is merely one type of location aware mobile application which may be supported using embodiments of DyMo.

It will be appreciated that, although primarily presented herein with respect to embodiments in which a particular type of information (e.g., feedback information) is probabilistically collected from a wireless end device based on evaluation of a particular type of condition (e.g., based on the evaluation of a measured quality level of the wireless end device with respect to an associated quality threshold), in at least some embodiments various other types of information may be probabilistically collected from a wireless end device, in at least some embodiments information may be collected from a wireless end device based on evaluation of other types of conditions, or the like, as well as various combinations thereof. For example, various types of information that may be probabilistically collected from a wireless end device may include measurements collected by the wireless end device, user quality of experience information associated with one or more applications of the wireless end device, measurements collected by one or more sensing devices associated with the wireless end device, or the like, as well as various combinations thereof. For example, various types of conditions which may be evaluated in order to determine whether to apply probabilistic collection of information from a wireless end device may include evaluation of a measured quality level of the wireless end device with respect to an associated quality threshold, evaluation of data collected by the wireless end device or data collected by a sensing device associated with the wireless end device, evaluation of one or more user quality of experience measures, or the like, as well as various combinations thereof.

In at least some embodiments, an apparatus (e.g., a wireless end device, an element configured for inclusion in or association with a wireless end device, or the like) may include a processor and a memory communicatively connected to the processor, where the processor is configured to receive data collection instruction information including an indication of a condition (or a basis for evaluating a condition) and an indication of a probability that the wireless end device is to provide data to a network device, determine whether the condition is satisfied, determine, based on a determination that the condition is satisfied and based on the probability, whether the wireless end device is to provide data to the network device, and send data toward the network device based on a determination that the data is to be provided to the network device. It will be appreciated that, in at least some embodiments, method 400 of FIG. 4 may be adapted in accordance with such embodiments.

In at least some embodiments, an apparatus (e.g., a wireless access device, an element configured for inclusion in or association with a wireless access device, or the like) may include a processor and a memory communicatively connected to the processor, where the processor is configured to receive data collection instruction information including an indication of a condition (or a basis for evaluating a condition) and an indication of a probability that a wireless end device is to provide data to a network device, send the data collection instruction information toward a set of wireless end devices, receive, from one of the wireless end devices, data of the one of the wireless end devices, and send the data toward a network device. It will be appreciated that, in at least some embodiments, method 300 of FIG. 3 may be adapted in accordance with such embodiments.

In at least some embodiments, an apparatus (e.g., a network device, an element configured for inclusion in or association with a network device, or the like) may include a processor and a memory communicatively connected to the processor, where the processor is configured to determine a condition (or a basis for evaluating a condition) and a probability that a given wireless end device is to provide data to a network device based on the condition (or the basis for evaluating the condition) and send, toward a set of wireless end devices, data collection instruction information comprising an indication of the condition (or the basis for evaluating the condition) and an indication of the probability that the given wireless end device is to provide data to the network device. It will be appreciated that, in at least some embodiments, method 200 of FIG. 2 may be adapted in accordance with such embodiments.

Figure 7:
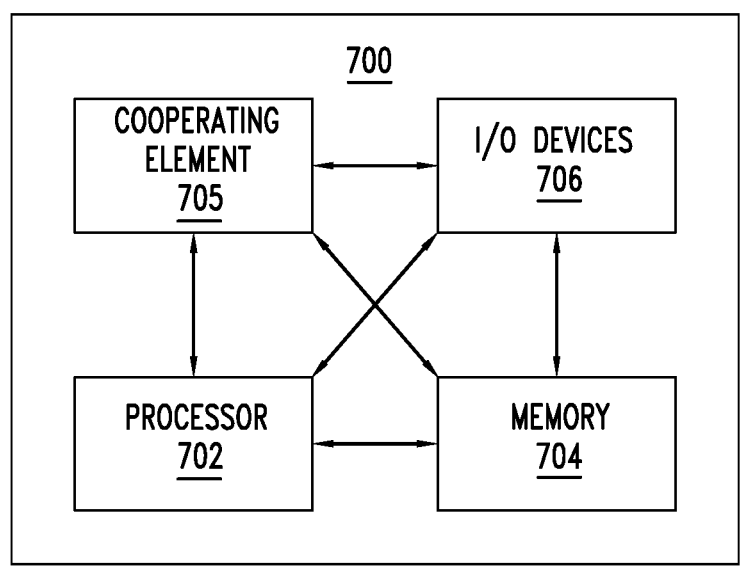
FIG. 7 depicts a high-level block diagram of a computer suitable for use in performing various functions described herein.

FIG. 7 depicts a high-level block diagram of a computer suitable for use in performing various functions presented herein.

The computer 700 includes a processor 702 (e.g., a central processing unit (CPU), a processor having a set of processor cores, a processor core of a processor, or the like) and a memory 704 (e.g., a random access memory (RAM), a read only memory (ROM), or the like). The processor 702 and the memory 704 are communicatively connected.

The computer 700 also may include a cooperating element 705. The cooperating element 705 may be a hardware device. The cooperating element 705 may be a process that can be loaded into the memory 704 and executed by the processor 702 to implement functions as discussed herein (in which case, for example, the cooperating element 705 (including associated data structures) can be stored on a non-transitory computer-readable storage medium, such as a storage device or other storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 of FIG. 7 may represent a general architecture and functionality suitable for implementing functional elements described herein, portions of functional elements described herein, or the like, as well as various combinations thereof. For example, computer 800 may provide a general architecture and functionality that is suitable for implementing all or part of one or more of the various devices and elements presented herein.

It will be appreciated that at least some of the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to cause a wireless end device to at least:
receive feedback collection instruction information including a set of quality thresholds and, for each of the quality thresholds, a respective feedback probability that the wireless end device is to provide feedback information to a network device, wherein the quality thresholds and the feedback probabilities are inversely related;
determine a measured quality level of the wireless end device;
determine, based on a determination that the measured quality level of the wireless end device is associated with one of the quality thresholds and based on the respective feedback probability associated with the one of the quality thresholds, whether the wireless end device is to provide feedback information to the network device; and
send feedback information toward the network device based on a determination that the wireless end device is to provide feedback information to the network device.

2. The apparatus of claim 1, wherein the one of the quality thresholds comprises a signal-to-noise ratio (SNR) threshold and the measured quality level of the wireless end device comprises a measured SNR measured by the wireless end device.

3. The apparatus of claim 1, wherein the feedback collection instruction information further comprises an indication of feedback information to be collected.

4. The apparatus of claim 3, wherein the feedback information to be collected comprises at least one of wireless end device identification information, wireless end device location information, or quality-of-service information.

5. The apparatus of claim 4, wherein the quality-of-service information comprises at least one of radio frequency (RF) signal measurement information or information indicative of packets received and lost by the wireless end device.

6. The apparatus of claim 1, wherein the feedback collection instruction information further comprises an indication of a feedback rate at which feedback information is to be reported.

7. The apparatus of claim 1, wherein the feedback collection instruction information is received via a multicast message or a broadcast message.

8. The apparatus of claim 1, wherein the feedback collection instruction information is received via a message distributed using a broadcast-multicast service.

9. The apparatus of claim 8, wherein the broadcast-multicast service comprise a Long Term Evolution (LTE) evolved Multimedia Broadcast Multicast Service (eMBMS).

10. The apparatus of claim 1, wherein the feedback information comprises at least one of wireless end device identification information, wireless end device location information, or quality-of-service information.

11. The apparatus of claim 10, wherein the quality-of-service information comprises at least one of radio frequency (RF) signal measurement information or information indicative of packets received and lost by the wireless end device.

12. An apparatus, comprising:
 a processor and a memory communicatively connected to the processor, the processor configured to cause a wireless access device to at least:
  receive feedback collection instruction information including a set of quality thresholds and, for each of the quality thresholds, a respective feedback probability indicative as to whether a wireless end device is to provide feedback information to a network device based on a determination that a measured quality level of the wireless end device does not satisfy the respective quality threshold, wherein the quality thresholds and the feedback probabilities are inversely related; and
  send the feedback collection instruction information toward a set of wireless end devices.

13. The apparatus of claim 12, wherein the processor is configured to cause the wireless access device to at least:
 receive, from one of the wireless end devices, feedback information of the one of the wireless end devices; and
 send the feedback information from the wireless access device toward a network device.

14. An apparatus, comprising:
 a processor and a memory communicatively connected to the processor, the processor configured to:
  determine feedback collection instruction information including a set of quality thresholds and, for each of the quality thresholds, a respective feedback probability indicative as to whether a wireless end device is to provide feedback information to a network device based on a determination that a measured quality level of the wireless end device does not satisfy the respective quality threshold, wherein the quality thresholds and the feedback probabilities are inversely related; and
  send, toward a set of wireless end devices, the feedback collection instruction information.

15. The apparatus of claim 14, wherein the processor is configured to:
 determine the set of wireless end devices, from a set of candidate wireless end devices, based on respective quality values associated with the candidate wireless end devices.

16. The apparatus of claim 15, wherein the respective quality values associated with the candidate wireless end devices comprise signal-to-noise ratio (SNR) values or packet delivery rate (PDR) values.

17. The apparatus of claim 14, wherein the processor is configured to:
 receive, from at least a portion of the wireless end devices, respective feedback information collected based on the feedback collection instruction information.

18. The apparatus of claim 17, wherein the processor is configured to:
 perform service evaluation for delivery of content via a broadcast-multicast service based on the respective feedback information.

19. The apparatus of claim 18, wherein the processor is configured to:
 determine, based on the service evaluation, tuning of a parameter associated with delivery of the content via the broadcast-multicast service.

20. The apparatus of claim 19, wherein the parameter comprises at least one of a modulation and coding scheme (MCS) parameter, a forward error correction (FEC) parameter, or a content coding parameter.

* * * * *